United States Patent
Yamaguchi et al.

(10) Patent No.: US 6,614,938 B2
(45) Date of Patent: *Sep. 2, 2003

(54) IMAGE COMPRESSION WITH ORTHOGONAL TRANSFORM OF BLOCKS WITHIN A BOUNDED SHAPE

(75) Inventors: Noboru Yamaguchi, Yashio (JP); Toshiaki Watanabe, Yokohama (JP); Kenshi Dachiku, Kawasaki (JP); Yoshihiro Kikuchi, Yokohama (JP); Takashi Ida, Kawaski (JP); Takeshi Chujoh, Tokyo-To (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/006,653

(22) Filed: Dec. 10, 2001

(65) Prior Publication Data

US 2002/0048408 A1 Apr. 25, 2002

Related U.S. Application Data

(62) Division of application No. 09/365,806, filed on Aug. 3, 1999, now Pat. No. 6,339,657, which is a division of application No. 08/942,200, filed on Oct. 1, 1997, now Pat. No. 5,978,514, which is a continuation of application No. 08/554,916, filed on Nov. 9, 1995, now abandoned.

(30) Foreign Application Priority Data

Nov. 10, 1994 (JP) .............................................. 6-276599
Apr. 21, 1995 (JP) ................................................ 7-97073

(51) Int. Cl.$^7$ .............................. G06K 9/36; G06K 9/46
(52) U.S. Cl. ........................ 382/239; 382/243; 382/250; 382/253

(58) Field of Search ....................... 358/426.13, 426.14; 375/240.02, 240.08, 240.11, 240.18, 240.2, 240.22, 240.23, 240.24, 240.25; 382/173, 199, 232–233, 239–240, 242–243, 246, 248, 250–251, 253, 266

(56) References Cited

U.S. PATENT DOCUMENTS 4,698,689 A  10/1987  Tzou ..................... 358/426.14

(List continued on next page.)

FOREIGN PATENT DOCUMENTS

| EP | 0 487 282 A2 | 5/1992 | .......... G06F/15/64 |
| EP | 0 584 741 A2 | 3/1994 | .......... H04N/1/41 |
| EP | 0 604 009 A1 | 6/1994 | .......... H04N/7/18 |
| JP | 5-95541 | 4/1993 | .......... H04N/7/137 |

OTHER PUBLICATIONS

Peter L. Silsbee, et al., "Visual Pattern Image Sequencing Coding," *IEEE Transactions on Circuits and Systems for Video Technology*, vol. 3, No. 4, Aug. 1993, pp. 291–301.
Chang et al., "Transform Coding of Arbitrarily-Shaped Image Segments," *ACM Multimedia*, 1993, pp. 83–90.

(List continued on next page.)

*Primary Examiner*—Timothy M. Johnson
(74) *Attorney, Agent, or Firm*—Finnegan, Henderson, Farabow, Garrett & Dunner, L.L.P.

(57) ABSTRACT

An image coding system that codes a map signal indicative of the position and shape of a content in a screen inputted for every block of picture signals to be coded; performs the orthogonal transform of the picture signals in accordance with the map signal to output an orthogonal transform coefficient; and codes the orthogonal transform coefficient. The coding system may perform the two-dimensional orthogonal transform of the picture signals of all the pixels with respect to the blocks located inside of the content, and may perform the orthogonal transform of only the signals of the pixels contained in the content with respect to the blocks containing the boundary portion of the content.

10 Claims, 31 Drawing Sheets

U.S. PATENT DOCUMENTS

| | | | |
|---|---|---|---|
| 4,951,140 A | 8/1990 | Ueno et al. | 348/413.1 |
| 5,144,688 A | 9/1992 | Bovir et al. | 382/166 |
| 5,150,432 A | 9/1992 | Ueno et al. | 382/250 |
| 5,225,904 A | 7/1993 | Golin et al. | 375/240.12 |
| 5,227,875 A | 7/1993 | Suu et al. | 375/240.25 |
| 5,241,395 A | 8/1993 | Chen | 358/426.14 |
| 5,267,333 A | 11/1993 | Aono et al. | 382/166 |
| 5,309,232 A | 5/1994 | Hartung et al. | 348/384.1 |
| 5,321,750 A | 6/1994 | Nadan | 380/230 |
| 5,355,450 A | 10/1994 | Garmon et al. | 345/501 |
| 5,361,147 A | 11/1994 | Katayama et al. | 358/532 |
| 5,402,146 A | 3/1995 | Rodriguez et al. | 348/400.1 |
| 5,408,270 A | 4/1995 | Lim | 375/240.25 |
| 5,422,963 A | 6/1995 | Chen et al. | 382/232 |
| 5,488,483 A | 1/1996 | Murayama | 382/251 |
| 5,553,160 A | 9/1996 | Dawson | 382/166 |
| 5,592,302 A | 1/1997 | Hirabayashi | 382/236 |
| 5,608,458 A | 3/1997 | Chen et al. | 375/240.14 |
| 5,666,212 A | 9/1997 | Gilge | 382/243 |
| 5,684,536 A | 11/1997 | Sugiyama et al. | 375/240.2 |
| 5,734,755 A * | 3/1998 | Ramchandran et al. | 382/250 |
| 5,978,514 A * | 11/1999 | Yamaguchi et al. | 382/243 |
| 6,339,657 B1 | 1/2002 | Yamaguchi et al. | 382/239 |

OTHER PUBLICATIONS

Chang et al., Lossless Image Compression Methods for PET Imaging, Bio Medical Engineering–Applications, *Basis and Communications,* Jun. 25, 1996, pp. 309–316.

Torres et al., "Segmentation Based Coding of Textures using Stochastic Vector Quantization," *IEEE,* Apr. 19, 1994, pp. V–597–V–600.

Desai, Ujjaval Y., "DCT and Wavelet Based representations of Arbitrarily Shaped Image Segments," *IEEE,* Oct. 23, 1995, pp. 558–561.

* cited by examiner

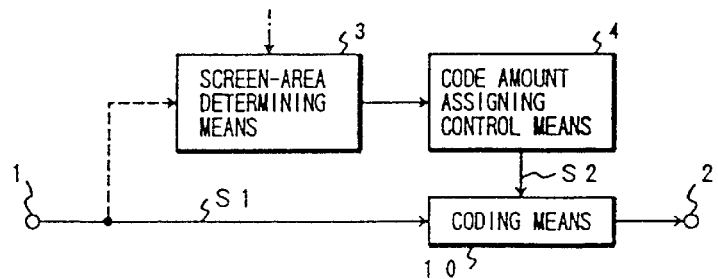
F I G. 1
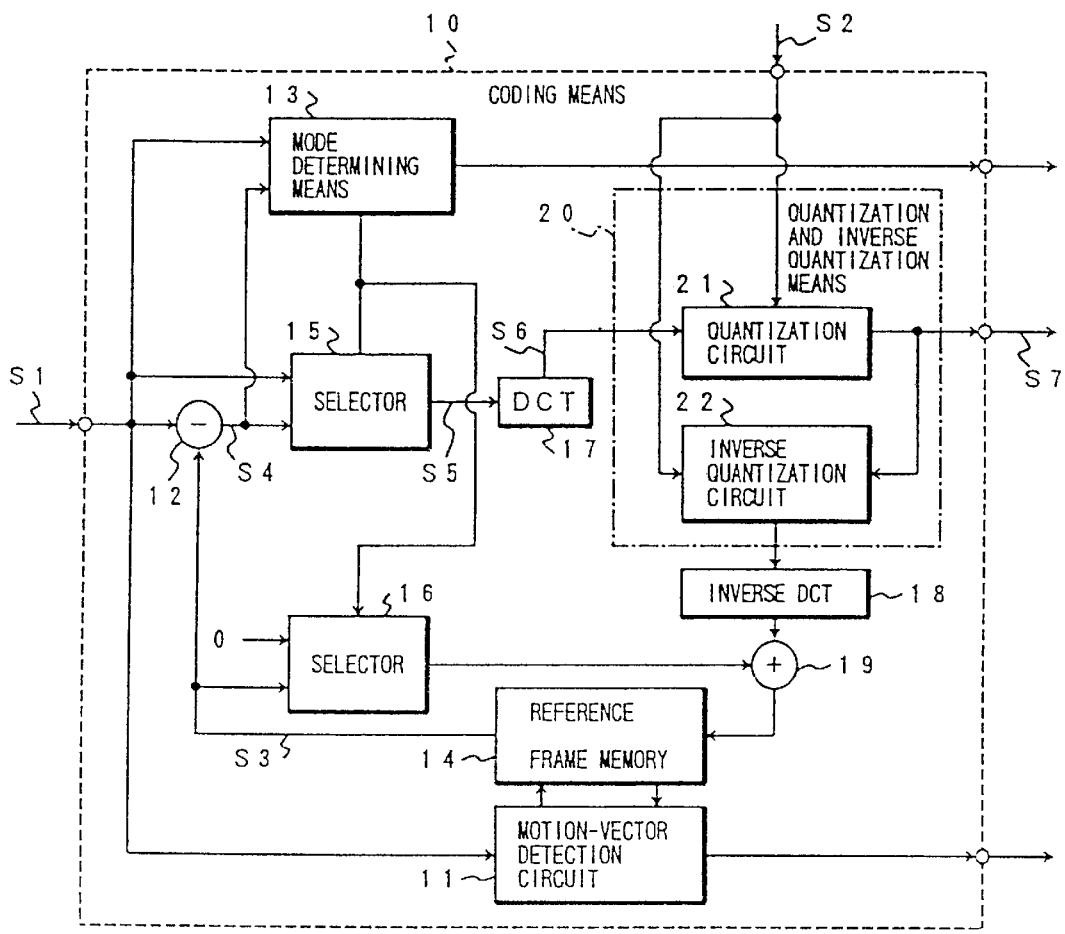
F I G. 2

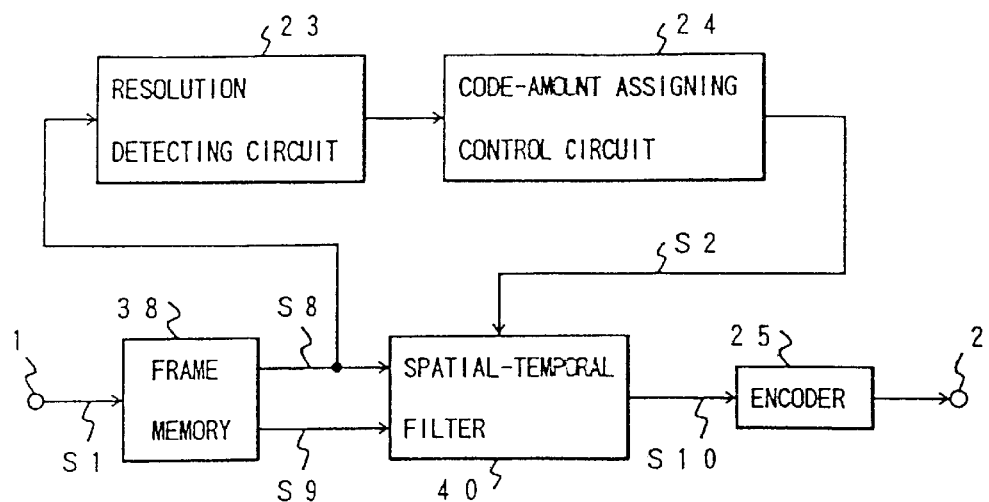
F I G. 8
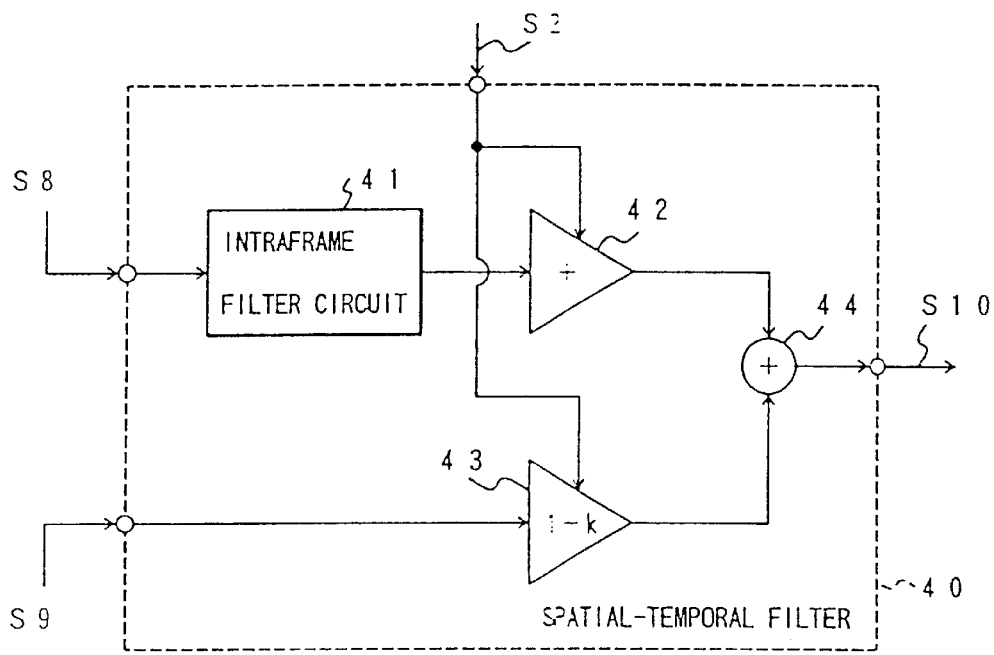
F I G. 9

FIG.10(a)
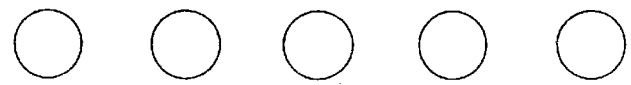
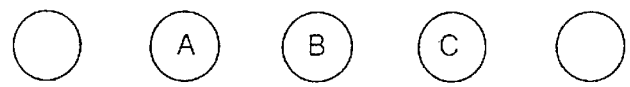
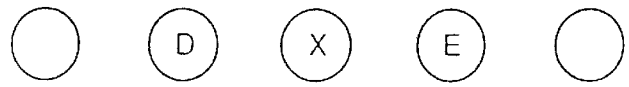
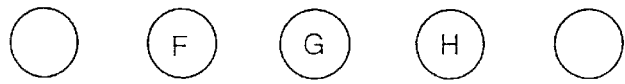
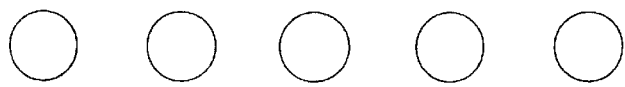
FIG.10(b)

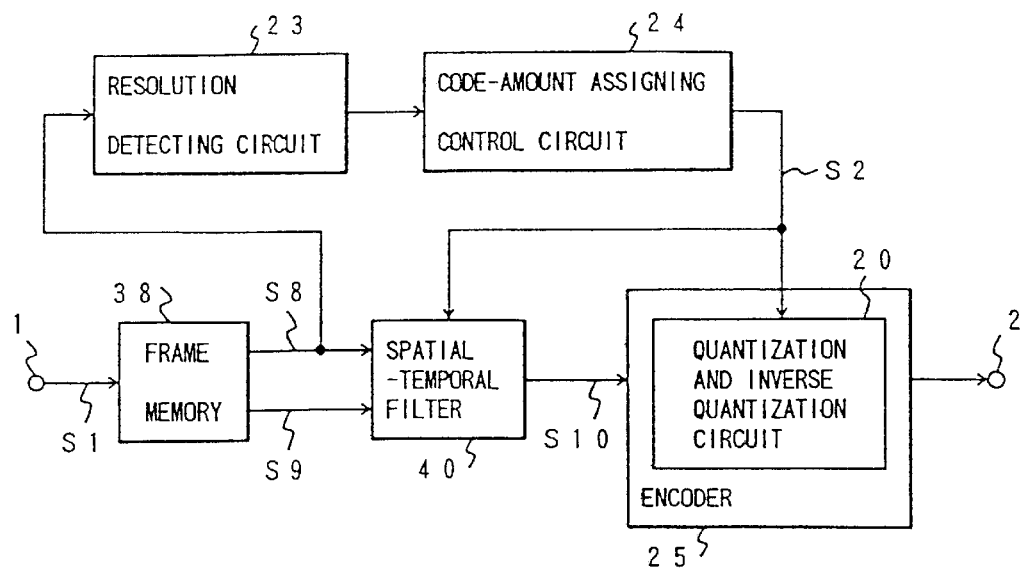
F I G. 1 1
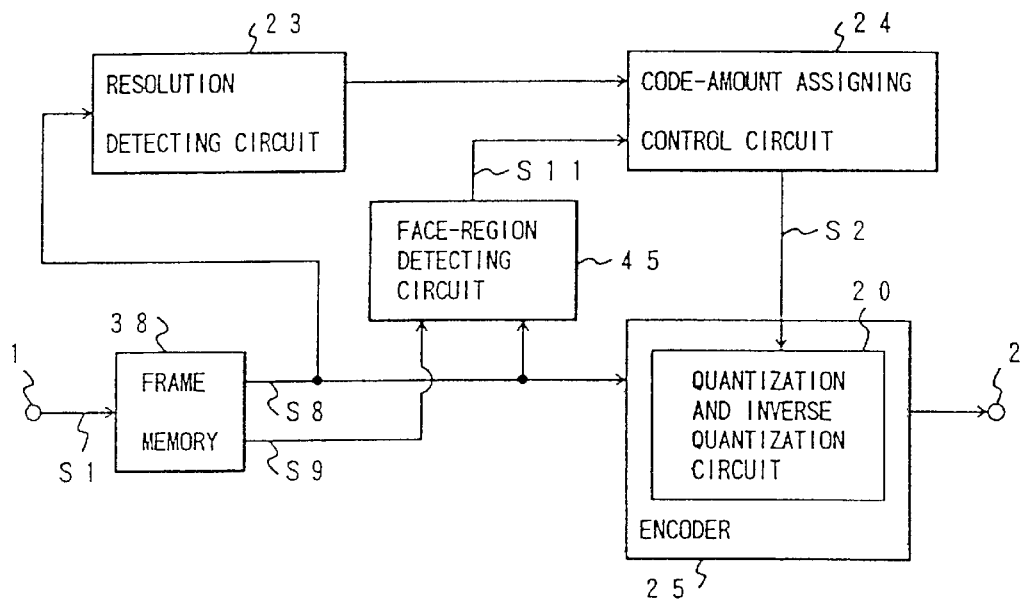
F I G. 1 2

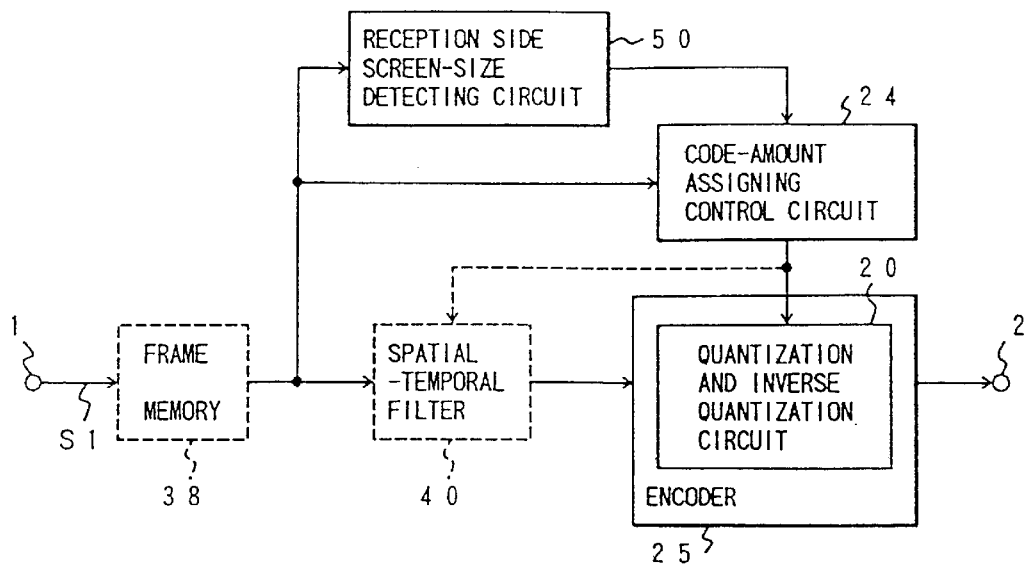
F I G. 16
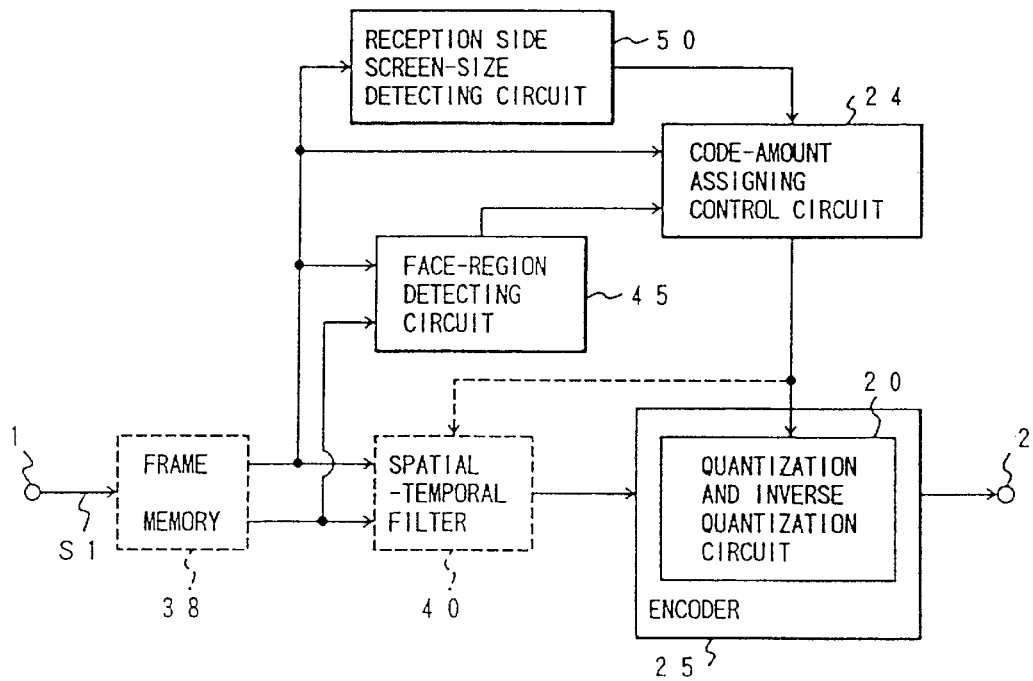
F I G. 17

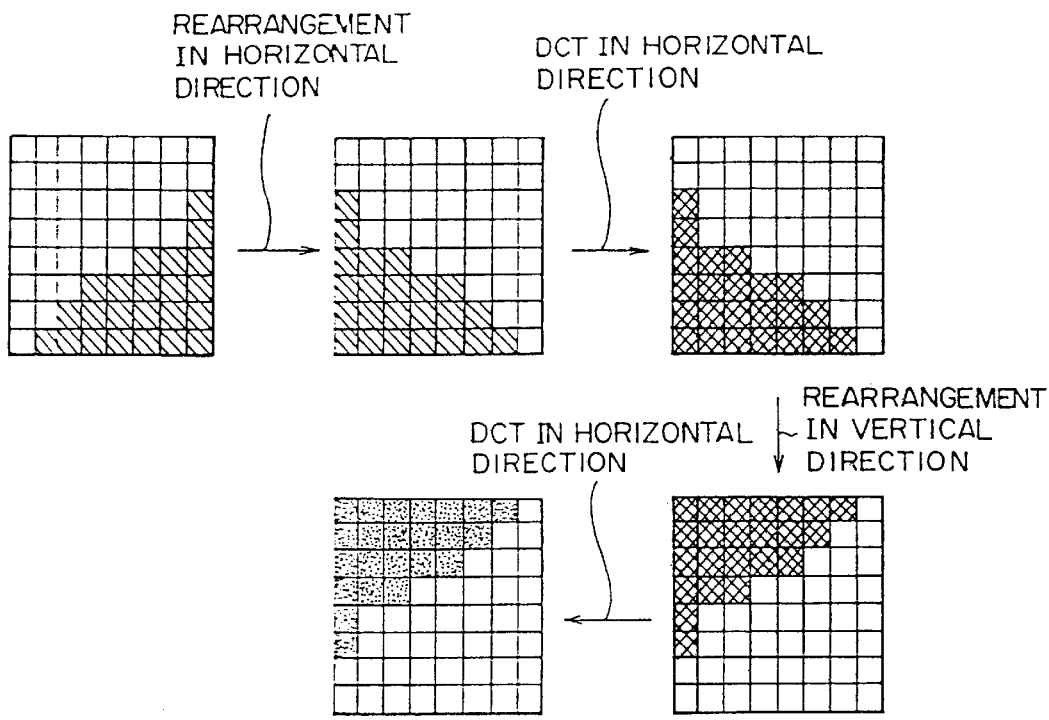
F I G. 25
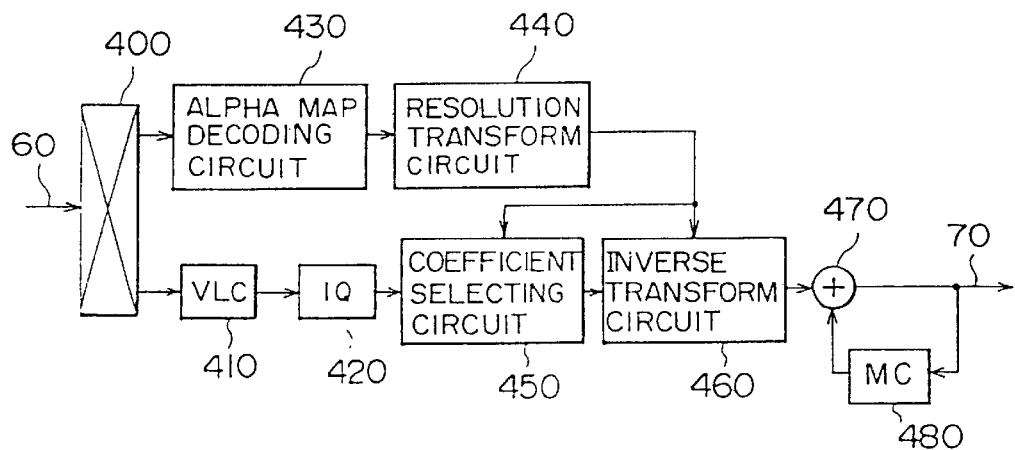
F I G. 26

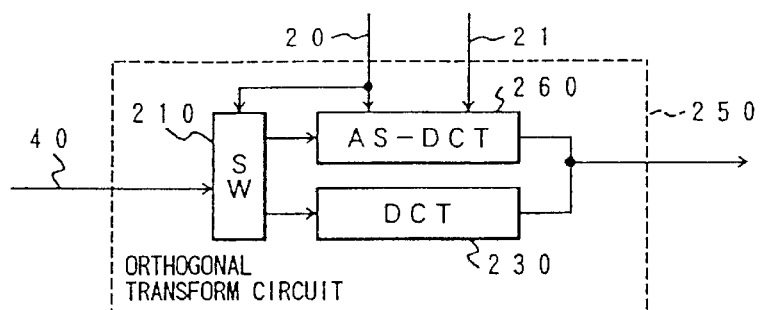
F I G. 29
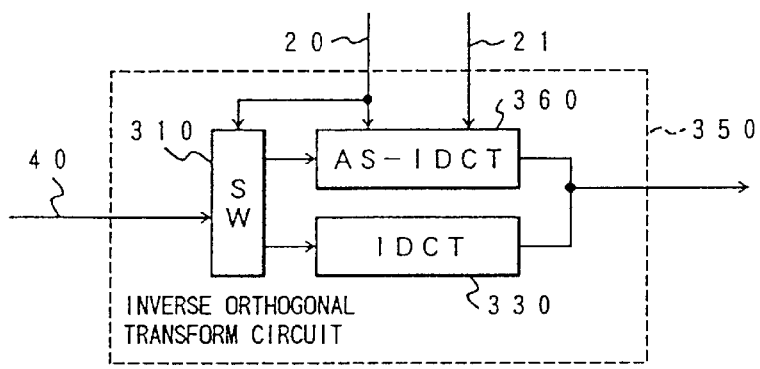
F I G. 30
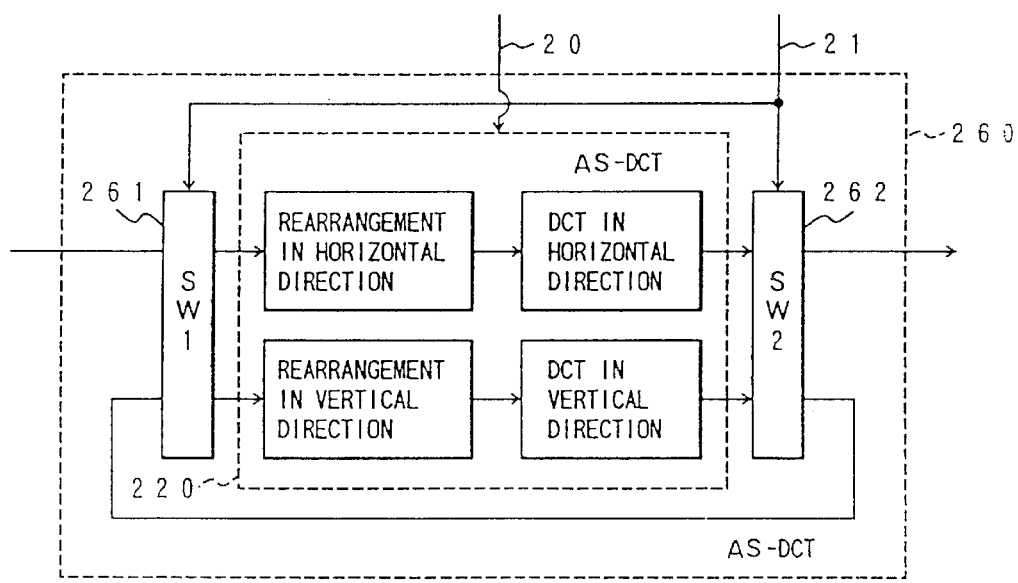
F I G. 31

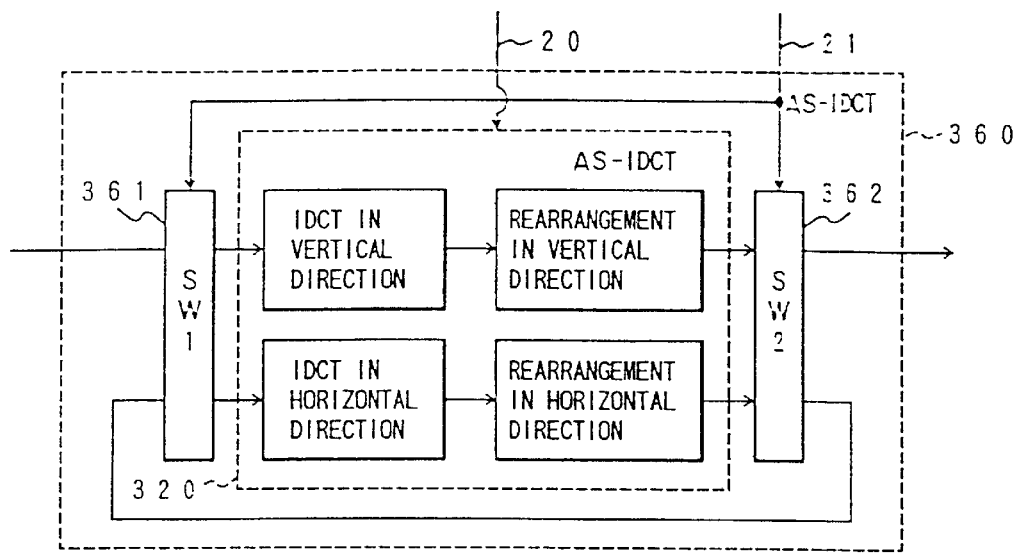
F I G. 32
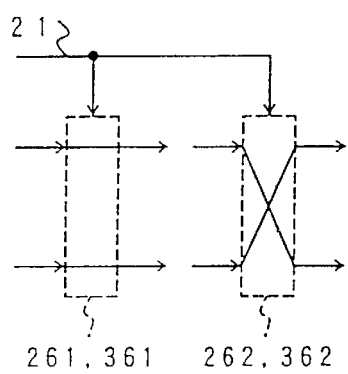
F I G. 33(a)
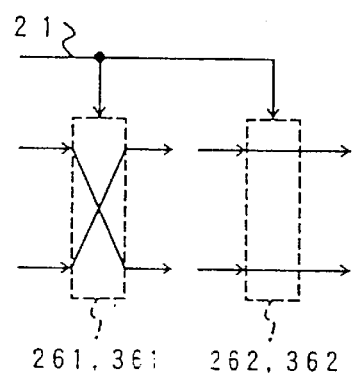
F I G. 33(b)

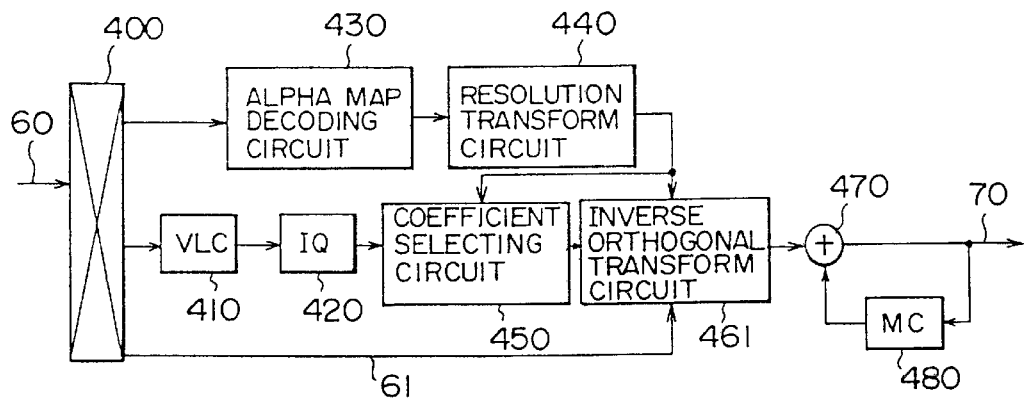
F I G. 34
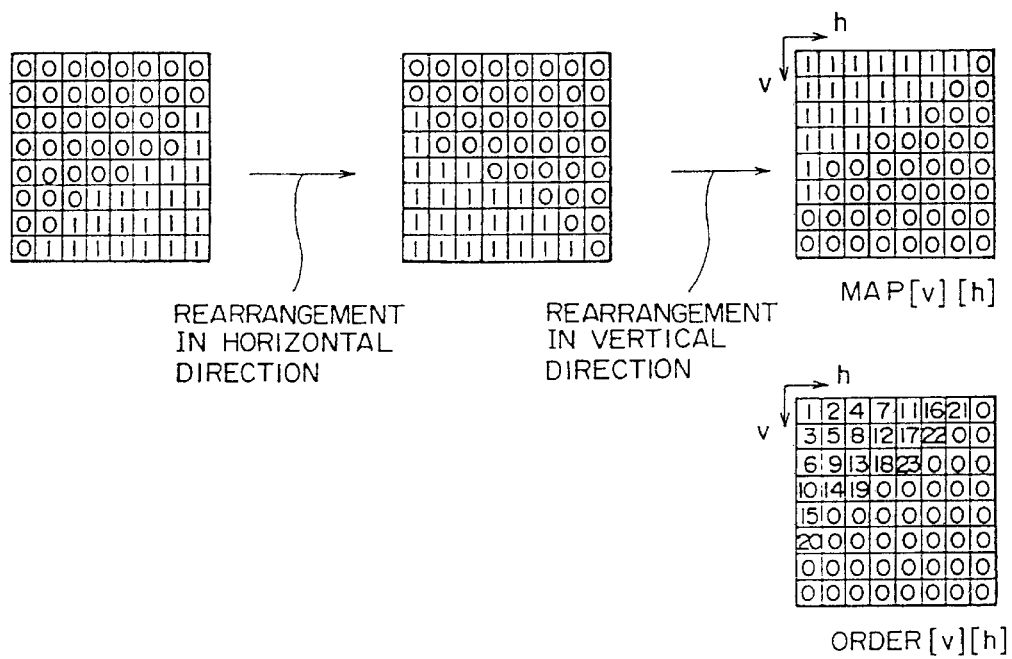
F I G. 35

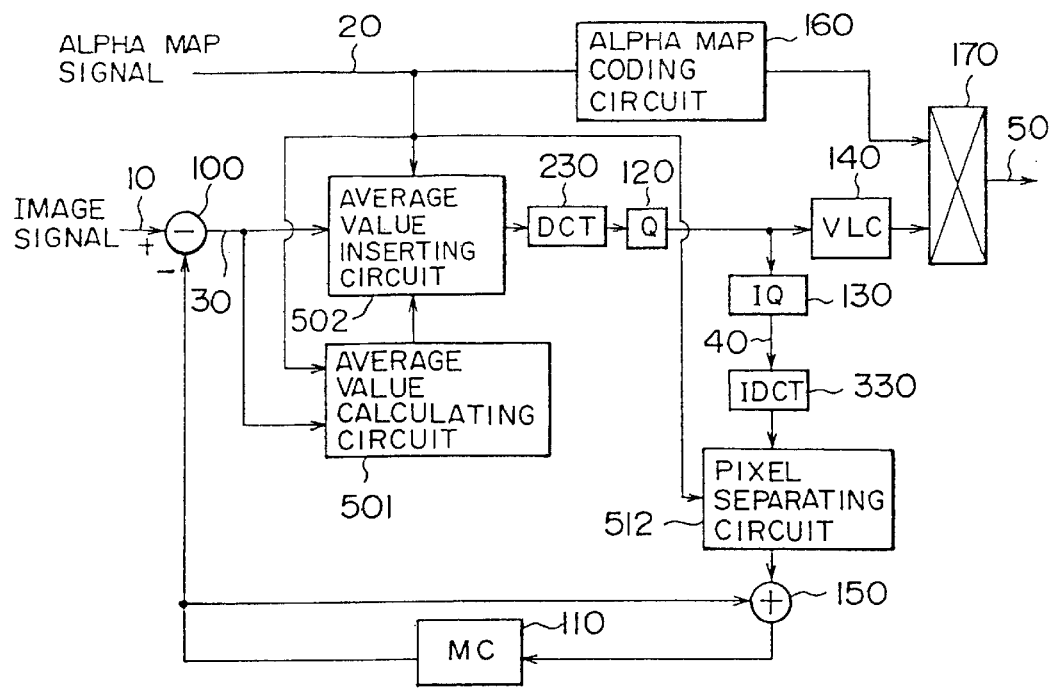
F I G. 41
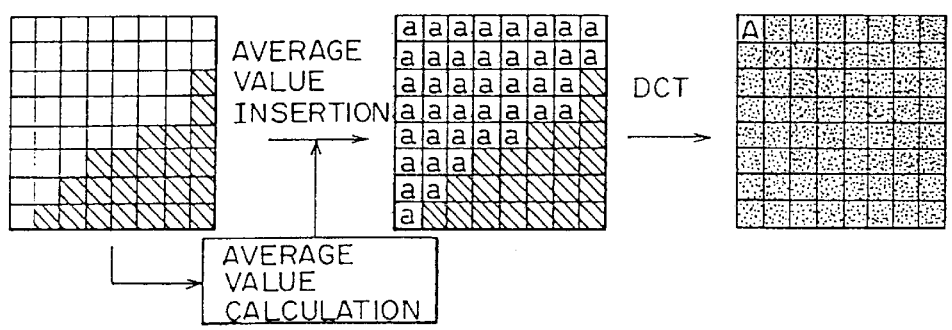
F I G. 42

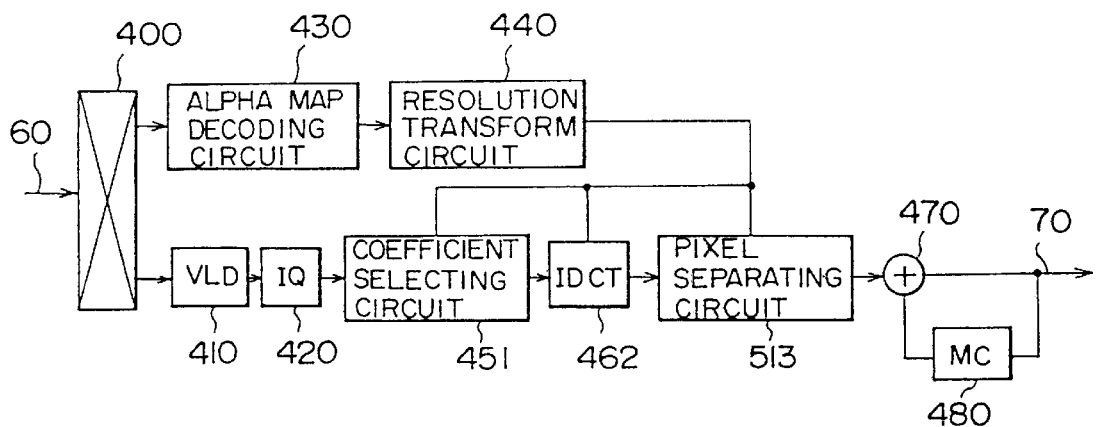
F I G. 43
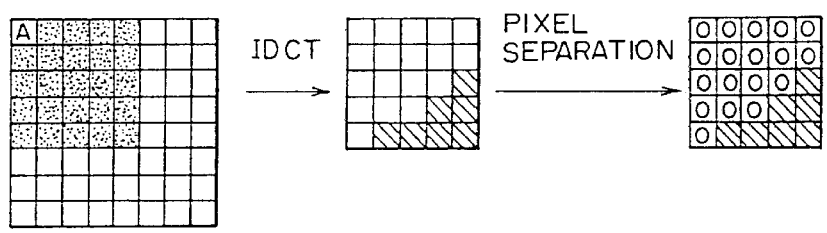
F I G. 44

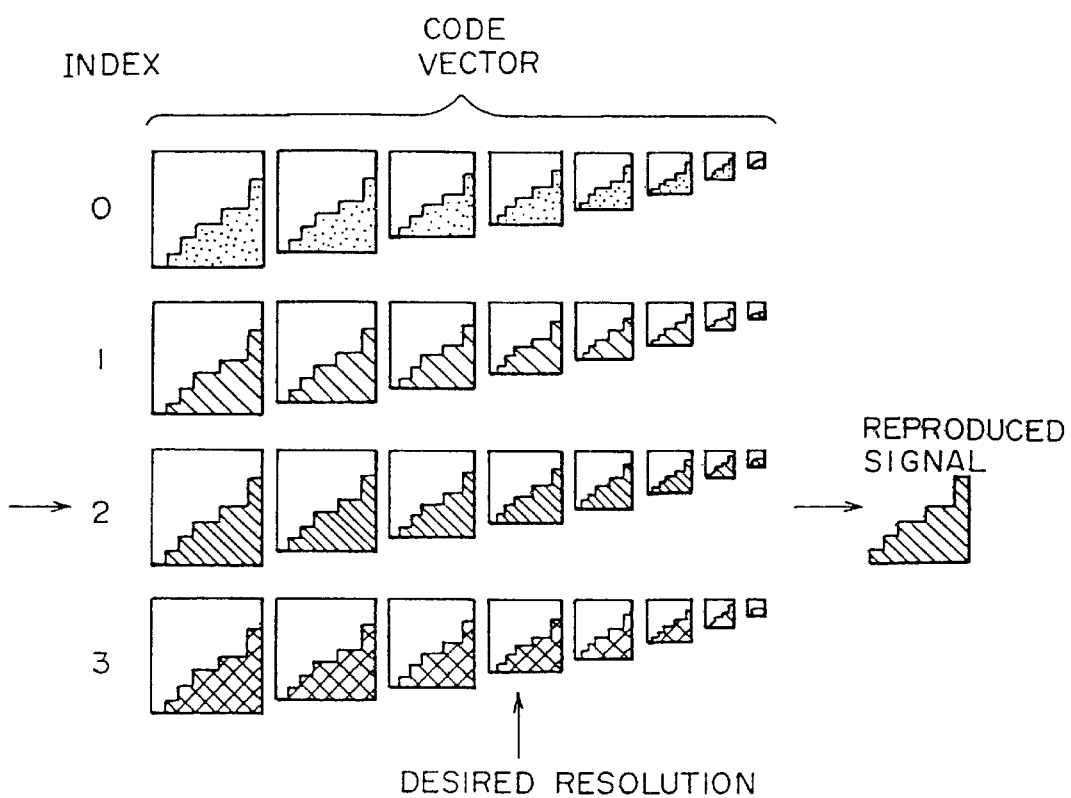
F I G. 49

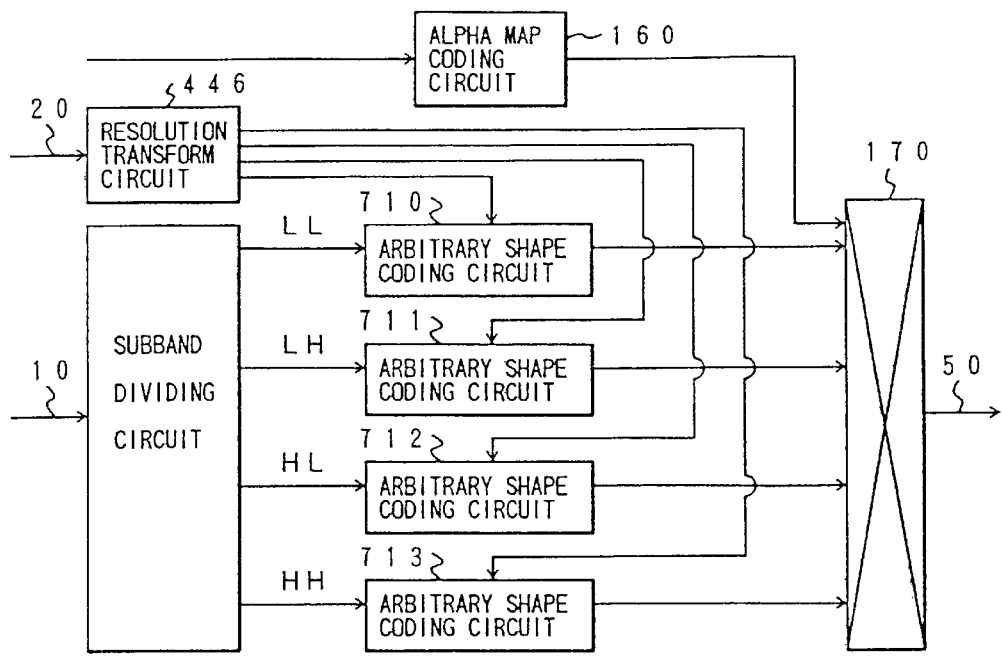
F I G. 5 2
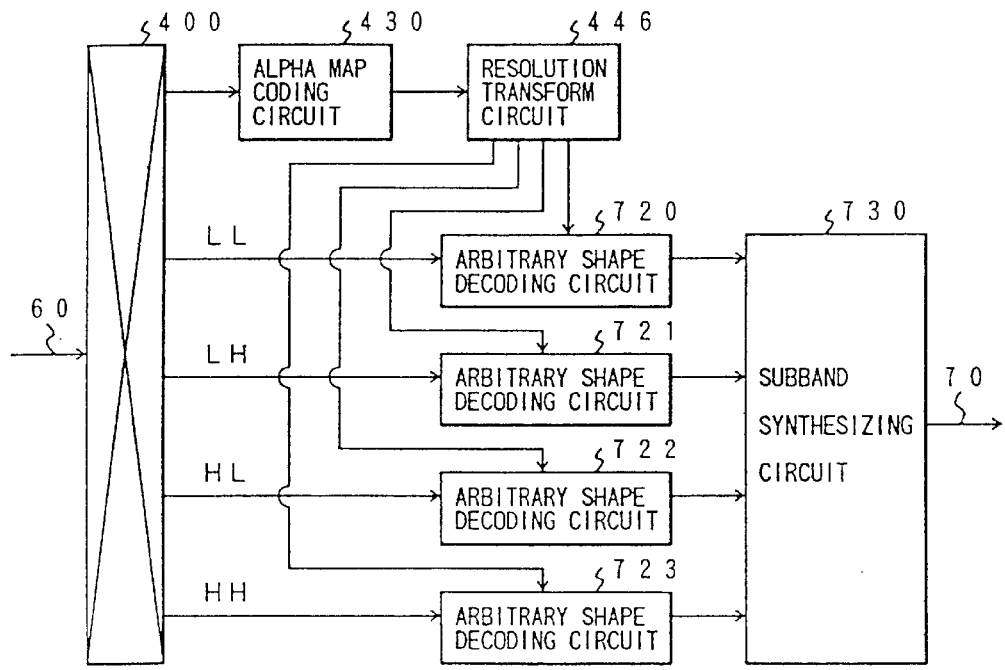
F I G. 5 3

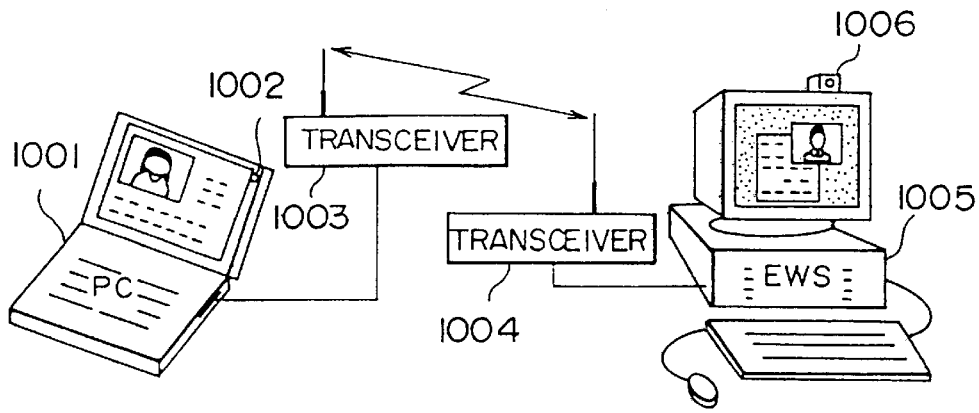
F I G. 54

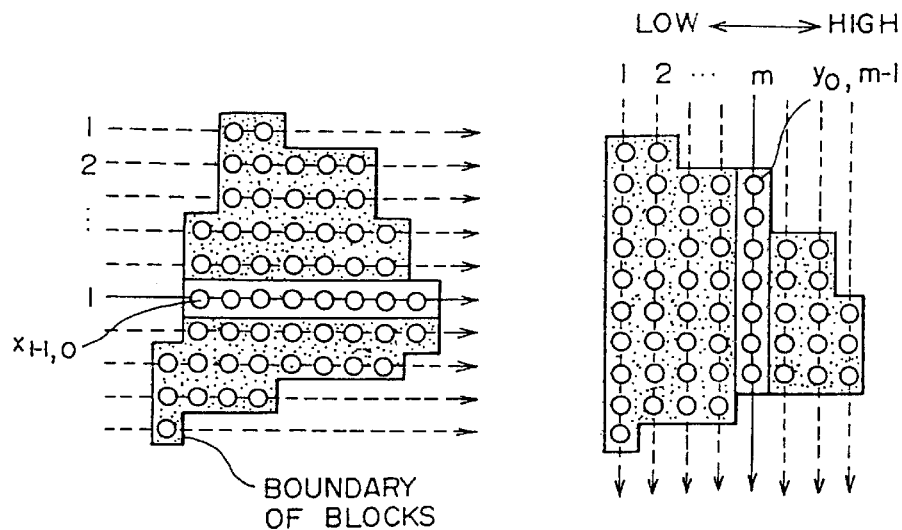
FIG.58(a) PRIOR ART
FIG.58(b) PRIOR ART
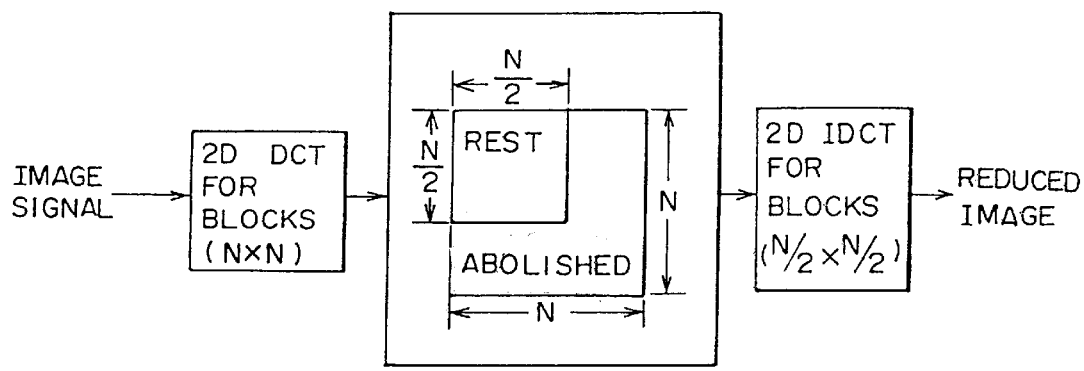
FIG.59 PRIOR ART

IMAGE COMPRESSION WITH ORTHOGONAL TRANSFORM OF BLOCKS WITHIN A BOUNDED SHAPE

This is division of application Ser. No. 09/365,806 filed Aug. 3, 1999, now U.S. Pat. No. 6,339,657, which is a division of application Ser. No. 08/942,200, filed Oct. 1, 1997, which is now U.S. Pat. No. 5,978,514, which is a continuation of application Ser. No. 08/554,916, filed Nov. 9, 1995, now abandoned.

BACKGROUND OF THE INVENTION

The present invention relates generally to an image data coding and/or decoding system which can carry out high-efficient coding of picture signals to transmit and store. More specifically, the invention relates to an image data coding system which can code and transmit picture signals to display an image on a liquid crystal display with a small screen which can be built in a wristwatch and so forth.

In the coding of image data used for a visual telephone (TV phone), a television conference and so forth, the image data efficiently compressed utilizing human's visual characteristic are used. The human's visual characteristic with respect to the distortion of a picture utilized here are as follows (see "Image Information Compression", issued by Japanese Television Society and complied under the supervision of Hiroshi Harashima, page 12).

(1) Frequency Characteristic in Distortion Perception

Distortion varying with elapsed time and distortion with high spatial frequency are difficult to be visible to the naked eye.

(2) Relationship with Pattern of Image

Distortion is easy to be perceived at the flat portion of the image, and difficult to be visible on the contour portion of the image. However, this is the case of a still picture. In a moving picture, the distortion on the contour portion serves as an edge busyness to conversely offend the eye.

(3) Relationship Between Image and Motion

When a picture is moving at a higher speed than a given speed and the user's eyes can not follow its motion, the perception sensitivity to distortion lowers.

(4) Relationship with switching of Scene

Immediately after a scene has been switched, the distortion is not to be visible to the naked eye if the resolution considerably lowers.

(5) Relationship with Brightness of Screen

The more the screen is dark, the more the picture distortion of the same level is easy to be visible to the naked eye.

(6) Color Signal and Luminance Signal

Since distortion by color signals is more difficult to be visible to the naked eye than that by luminance signals, for example, it is possible to thin out sampled points of the color signals.

In addition, since visual acuity (spatial resolving power) on the peripheral portions of the visual field is worse than that on the central portion thereof under the influence of the distribution of visual receptor cells on retinas, it is necessary for an user to move his eyes (eye movement) in order to obtain information such as shape, structure and detail contents (see "Image Information Compression" issued by Television Society, published by Ohm, page 41). Therefore, to determine the definition of the picture in view of human's visual characteristic is dominated by the movement of human's eye serving as a subjective factor in addition to the resolution of the picture serving as an objective factor.

On the other hand, when a human looks at an object, if the object is small, it is possible to recognize the whole shape and so forth of the object by staring a specific range around a point. However, if the object is large, it is necessary to closely observe a wide range including a large number of points to recognize the whole shape and so forth of the object. When he watches a television receiver, if its screen is large, a large number of closely observed points are distributed in a given range by frequently moving his eyes, but if the screen is small, the range wherein the closely observed points are distributed does not so extend.

It is disclosed in "Estimation Technique of Image Quality and Tone Quality" (edited Television Society and published by Shokodo, page 118) that since the display screen in a high quality television system which rapidly approaches to implementation in recent years is greater than those of current television systems, the closely observed points distributing ranges in these systems are different. FIG. 5.22 on the same page of this paper shows the measured results of proportion of the closely observed points distributing range to the area of the screen when observing a high quality television system and a current television system on a standard observation condition using a program of the same content. This figure is expressed by approximating to an ellipse with three times as large as the standard deviation assuming that the closely observed points lie on a normal distribution in horizontal and vertical directions when the center of the screen is the origin. It is also shown the experimental results that the proportion of the distributing range of the closely observed points to the area of the screen is about 60% in the current television systems, but it reaches about 80% in the high quality television system. That is, as the size of the screen decreases, the proportion of the distributing range of the closely observed points decreases and the range concentrates on the center of the screen. Therefore, since the spatial resolving power of the visual sensation on the peripheral portion of the screen is inferior, the information compression can be efficiently carried out by lowering the spatial resolution or by weighting the assignment of the distortion in preprocessing.

By the way, as a method for efficiently compressing the measure of information using the difference between the visual characteristic at the central portion of the visual field (central vision) and the visual characteristic at the peripheral portion of the visual field (peripheral vision), there is a method disclosed in, for example, "Visual Pattern Image Sequence Coding" (August 1993, IEEE TRANSACTIONS ON CIRCUITS AND SYSTEMS FOR VIDEO TECHNOLOGY, VOL.3, NO.4, pp-291–301). In the technique disclosed in this literature, a function relating to the position of radius r from the central point of the screen is derived, and the resolution on the peripheral portion of the screen is lowered using this function.

In addition, as a method for performing the information compression by changing the distribution of the assigned code amount in a visually important region and an unimportant region, there are two methods as follows.

One of the methods has been proposed as applied to a video telephone (Japanese Patent Application Laid-open No. 1-80185 (1989) "Moving Picture Coding Method"). In this method, on the assumption that the closely observed points are concentrated on the face of the opposite party for the telephone conversation, the face region is detected to assign many code amount on the detected face region.

Another method is also applied to a video telephone similar to the aforementioned proposal (Japanese Patent Application Laid-open No. 5-95541 (1993)). Similar to the aforementioned proposal, by detecting the face region to apply a spatial-temporal filtering to a region other than the face, the code amount produced in this region other than the face is decreased, and the code amount assigned in the face region is increased.

Both of these conventional methods pay attention to human's visual characteristic, and provide a natural picture to a person which visually recognizes a reproduced picture, by changing the coded data amount so that the coding data amount in the region in which the closely observed points are concentrated in the distribution of closely observed points, is different from the coding data amount in the region in which the closely observed points are not so concentrated.

As mentioned above, in both of the conventional image data coding methods, the information compression has been efficiently performed using human's visual characteristic by restraining the code amount produced in a visually unimportant region and by increasing the code amount assigned to a visually important region. However, both of the techniques disclosed in the aforementioned two publications only classify the regions in the screen on the basis of the degree of concentration of the distribution of closely observed points, to vary the code amount assigned to each of the regions, and these techniques do not consider human's visual characteristic that the distribution of closely observed points is different by the size (area) of the screen as described in the aforementioned literature "Estimation Technique of Image Quality and Tone Quality".

In addition, there are problems in that when the image data are transmitted via a radio transmitting channel having a narrower bandwidth than that of a wire transmitting channel, the resolution of the reproduced picture is generally decreased by the limit of the transmitted amount due to the narrow bandwidth, so that the size (area) of the screen is necessarily decreased.

By the way, in conventional image data coding systems, for example, in moving picture data coding systems defined by MPEG, after inputted picture signals are divided into square blocks of 8×8 pixels as shown in FIG. 55, the two-dimensional discrete cosine transform (DCT) is performed for coding.

On the other hand, in "Applying Mid-level Vision Techniques for Video Data Compression and Manipulation" (M.I.T. Media Lab. Tech. Report No.263, February 1994), which will be hereinafter referred to as "Literature 1", J. Y. Wang et.al. disclose that picture signals are divided into a background and a subject (which will be hereinafter referred to as a "content") for coding, as shown in FIG. 56. Thus, in order to code the background and the content separately, a map signal called a alpha map indicative of the shape of the content and its position in a screen is prepared. In this coding method, it is possible to vary the picture quality content by content and to reproduce only a specific content. However, as shown in FIG. 55, in a case where the interior of a screen is divided into square blocks for coding, it is required to separately process the blocks containing the boundary portion of the content, i.e. the edge blocks between the inside and outside of the content, as shown in FIG. 57.

It has been also proposed a method for coding picture signals after dividing the interior of a screen into blocks of optional shapes so as to adapt to statistical characteristic in the screen and to the shape of a content. Such a method for performing the orthogonal transform of an optional shape is disclosed in "Examination of Variable Block Size Transform Coding of Image Using DCT" (Matsuda et. al., Singaku-Shuki-Daizen D-146, 1992), which will be hereinafter referred to as "Literature 2". In this specification, this transform method will be hereinafter referred to as "AS-DCT". In AS-DCT, first, one-dimensional DCT is performed in a horizontal (or vertical) direction as shown in FIG. 58(*a*), and then, after it is rearranged in order of the low of the DCT coefficient as shown in FIG. 58(*b*), the one-dimensional DCT is performed in a vertical (or horizontal) direction.

Also, in "Estimation of Performance of Variable Block Shape Transform Coding of Image Using DCT" (Matsuda et.al., PCSJ92, 7–10, 1992), which will be hereinafter referred to as "Literature 3", the coding efficiency has been improved by selecting the order of higher coding efficiency as a result of practical coding, as the order of the transform in the horizontal and vertical directions.

Further, "Image Data-Coding Techniques -DCT and Its International standard-" written by K. R. Rao and P. Yip and translated by Hiroshi Yasuda and Hiroshi Fujiwara (7.3, pp164–165, Ohm), which will be hereinafter referred to as "Literature 4", discloses a method for performing the resolution transform of picture signals using the two-dimensional DCT. That is, it is possible to transform the resolution by taking out a part of the DCT coefficient derived by the two-dimensional DCT to inversely transform by the DCT of a different degree, as shown in FIG. 59.

In a picture system such as a graphic display, in order to actualize various image effects, it is desired to perform the resolution transform of a content in a screen for the reduction and enlargement thereof. Since there are contents of various shapes, it is required to perform the resolution transform of contents of optional shapes. However, for example, in the AS-DCT which is a method for performing the orthogonal transform of optional shapes disclosed in the aforementioned Literature 2, it is impossible to actualize the resolution transform in a case where a block to be transformed is an edge block, i.e. a block containing the boundary portion of a content.

In addition, there are problems in that the coding efficiency to an edge block is low in the AS-DCT and other methods for performing the orthogonal transform of optional shapes.

SUMMARY OF THE INVENTION

It is therefore an object of the present invention to eliminate the aforementioned problems, and to provide an image data coding system which can efficiently compress information by changing only the assignment of the code amount without changing the absolute amount thereof in accordance with the decreasing of the size of a reproduced picture display, in view of the relationship between the size (area) of the screen and the distributing area of closely observed points.

In order to accomplish the aforementioned and other objects, an image data coding system, according to the present invention, comprises a screen area determining means for determining the size (area) of a screen reproduced on the basis of inputted image data signals, a code amount assigning control means for controlling the assignment of the code amount of data for every region on the screen on the basis of the results of determination, and a coding means for coding the image data signals inputted in accordance with the code amount assigned to every region.

With this construction, the weight function for assigning the code amount corresponding to the size of the screen is set so as to be changed by internally analyzing the inputted image data signals to determine the size of the screen, or by designating the size of the screen in an externally manual set mode. The assigned amount of the code amount is determined using the set weight function, and the coding of the image data signal is performed on the basis of the assigned amount. Therefore, the assignment of the code amount is changed using the weight function in accordance with the area of the screen, so that it is possible to provide the optimum screen for practical use by only determining or designating the size of the screen if the weight function is set in view of human's visual characteristic.

In an image data coding system, according to the present invention, the screen-area determining means may internally determine the area of the screen of the produced picture on the basis of the amount of the inputted image data signals and so forth, or externally designating the size of the screen in a manual operation. In the case of the determination by internal processing, the amount of the image data signals may be detected to detect the resolution of the produced screen on the basis of the number of pixels of the produced screen. Alternatively, the information relating to the size of the screen, which information are included in a part of the image data signals, may be transmitted to analyze the information by a determining means to determine the size of the screen.

In addition, it is an object of the present invention to provide an image data coding and/or decoding system which can perform the resolution transform of the blocks containing the boundary portion of a content.

It is also an object of the present invention to provide an image data coding and/or decoding system capable of high-efficient coding of the blocks containing the boundary portion of a content.

According to the present invention, the aforementioned and other objects can be accomplished by image data coding and/or decoding systems as described below.

According to a first aspect of the present invention, an image data coding system comprises:

a first coding means for coding a map signal indicative of the position and shape of a content in a screen inputted for every square block of picture signals to be coded;

an orthogonal transform means for performing the orthogonal transform of the picture signals in accordance with the map signal to output an orthogonal transform coefficient; and a second coding means for coding the orthogonal transform coefficient derived by the orthogonal transform means, wherein the orthogonal transform means performs the two-dimensional orthogonal transform of the picture signals of all the pixels with respect to the blocks located inside of the content, and performs the two-dimensional or one-dimensional orthogonal transform of only the picture signals of the pixels contained in the content with respect to the blocks containing the boundary portion of the content.

For example, with respect to the pixels in the blocks containing the boundary portion of the content, the orthogonal transform means may perform the one-dimensional orthogonal transform in the horizontal or vertical direction after rearranging the pixels contained in the content in the horizontal or vertical direction, and performs the one-dimensional orthogonal transform in the vertical or horizontal direction after putting the derived transform coefficients in order of the lower band of coefficient.

In this case, it may be provided with a correlation detecting means for detecting the respective correlations in the horizontal and vertical directions of the picture signals inside of the content, to switch the direction of the one-dimensional orthogonal transform so as to perform the one-dimensional orthogonal transform in order of the direction that the correlation is higher.

An image data decoding system adapted to the image data coding system, according to the first aspect of the present invention, comprises:

a first decoding means for decoding a coded map signal indicative of the position and shape of a content in a screen inputted for every square block of picture signals;

a resolution transform means for performing the resolution transform of the map signal decoded by the first decoding means;

a second decoding means for decoding coded orthogonal transform coefficients;

a coefficient selecting means for selecting an orthogonal transform coefficient necessary to reproduce an image of a predetermined resolution, from the orthogonal transform coefficients decoded by the second decoding means, on the basis of the map signal resolution-transformed by the resolution transform means;

an inverse orthogonal transform means for performing the inverse orthogonal transform of the orthogonal transform coefficient selected by the coefficient selecting means; and a reproducing means for deriving a regenerative picture signal resolution-transformed from the results of the inverse orthogonal transform by the inverse orthogonal transform means, wherein the inverse orthogonal transform means performs the two-dimensional orthogonal transform of all the coefficients with respect to the blocks located inside of the content among the orthogonal transform coefficients selected by the coefficient selecting means, and performs the two-dimensional or one-dimensional inverse orthogonal transform of only the coefficients contained in the content with respect to the blocks containing the boundary portion of the content.

For example, with respect to the blocks containing the boundary portion of the content, the inverse orthogonal transform means may perform the one-dimensional inverse orthogonal transform in the horizontal or vertical direction after rearranging the transform coefficients contained in the content in the horizontal or vertical direction, and performs the one-dimensional inverse orthogonal transform in the vertical or horizontal direction after rearranging them to the former positions of pixels.

When the first image data coding system switches the direction of the one-dimensional orthogonal transform so as to perform the one-dimensional orthogonal transform in order of the direction determined that the correlation is higher in the horizontal and vertical directions of the picture signals inside of the content, the first image data decoding system may switch the direction of the one-dimensional inverse orthogonal transform on the basis of the switching information of the first image data coding system.

According to a second aspect of the present invention, an image data coding system comprises:

a first coding means for coding a map signal indicative of the position and shape of a content in a screen inputted for every square block of picture signals to be coded;

an average value separating means for outputting an average value of the values of pixels inside of the content, with respect to blocks containing the boundary portion of the content in the picture signals, in accordance with the map signal, and for separating the average value from the values of the pixels inside of the content and for setting the values of pixels outside of the content to be zero for output thereof;

an orthogonal transform means for performing the two-dimensional orthogonal transform of the signals from which the average value has been separated by the average value separating means, to output orthogonal transform coefficients; and a second coding means for coding the orthogonal transform coefficients outputted by the orthogonal transform means, and the average value.

An image data decoding system adapted to the image data coding system, according to the second aspect of the present invention, comprises:

a first decoding means for decoding a coded map signal indicative of the position and shape of a content in a screen inputted for every square block of picture signals to be coded;

a resolution transform means for performing the resolution transform of the map signal decoded by the first decoding means;

a second decoding means for decoding coded orthogonal transform coefficients and an average value of pixels inside of the content;

a coefficient selecting means for selecting an orthogonal transform coefficient necessary to reproduce an image of a predetermined resolution, from the orthogonal transform coefficients decoded by the second decoding means, on the basis of the map signal resolution-transformed by the resolution transform means;

an inverse orthogonal transform means for performing the two-dimensional inverse orthogonal transform of the orthogonal transform coefficient selected by the coefficient selecting means; and a reproducing means for deriving a resolution-transformed regenerative picture signal by synthesizing the results of the two-dimensional inverse orthogonal transform by the inverse orthogonal transform means, with the average value decoded by the second decoding means, on the basis of the map signal resolution-transformed by the resolution transform means.

According to a third aspect of the present invention, an image data coding system comprises:

a first coding means for coding a map signal indicative of the position and shape of a content in a screen inputted for every square block of picture signals to be coded;

an average value inserting means for replacing the values of pixels outside of the content, by an average value of the values of pixels inside of the content in accordance with the map signal, with respect to the blocks containing the boundary portion of the content in the picture signals;

an orthogonal transform means for performing the two-dimensional orthogonal transform of the signals of the average value in the blocks produced by the average value inserting means, to output orthogonal transform coefficients; and a second coding means for coding the orthogonal transform coefficients outputted by the orthogonal transform means.

In this case, in the average value inserting means, the values of pixels outside of the content may be predicted under the condition that the average value of the pixels outside of the content coincides with the average value of the pixels inside of the content.

An image data decoding system adapted to the image data coding system, according to the third aspect of the present invention, comprises:

a first decoding means for decoding a coded map signal indicative of the position and shape of a content in a screen inputted for every square block of picture signals;

a resolution transform means for performing the resolution transform of the map signal decoded by the first decoding means;

a second decoding means for decoding coded orthogonal transform coefficients;

a coefficient selecting means for selecting an orthogonal transform coefficient necessary to reproduce an image of a predetermined resolution, from the orthogonal transform coefficients decoded by the second decoding means, on the basis of the map signal resolution-transformed by the resolution transform means;

an inverse orthogonal transform means for performing the two-dimensional inverse orthogonal transform of the orthogonal transform coefficient selected by the coefficient selecting means; and a reproducing means for deriving a resolution-transformed regenerative picture signal by taking out the values of pixels inside of the content, with respect to the blocks containing the boundary portion of the content, on the basis of the map signal resolution-transformed by the resolution transform means.

According to a fourth aspect of the present invention, an image data coding system comprises:

a first coding means for coding a map signal indicative of the position and shape of a content in a screen inputted for every square block of picture signals to be coded;

a vector quantizing means for performing the matching of the picture signal with code vectors stored in a code book and for outputting an index indicative of a code vector which has the highest correlation to the picture signal; and a second coding means for coding the index outputted by the vector quantizing means, wherein the vector quantizing means for performing the matching, with the code vectors, only the signals inside of the content with respect to the blocks containing the boundary portion of the content, in accordance with the map signal.

An image data decoding system adapted to the image data coding system, according to the fourth aspect of the present invention, comprises:

a first decoding means for decoding a coded map signal indicative of the position and shape of a content in a screen inputted for every square block of picture signals to be coded;

a resolution transform means for performing the resolution transform of the map signal decoded by the first decoding means;

a second decoding means for decoding a coded index; and an inverse vector quantizing means, having a code book storing therein code vectors indicated by multiple resolutions, for outputting a code vector designated by the index decoded by the second decoding means, wherein the inverse vector quantizing means derives a resolution-transformed regenerative picture signal by taking out only the signals inside of the content with respect to the blocks containing the boundary portion of the content, from the code vectors in accordance with the map signal resolution-transformed by the resolution transform means.

According to a fifth aspect of the present invention, an image data coding system comprises:

a first coding means for coding a map signal indicative of the position and shape of a content in a screen inputted for every square block of picture signals to be coded;

a subband dividing means for dividing the picture signal into a plurality of subband picture signals;

a resolution transform means for performing the resolution transform of the map signal into the resolution of each of the subband picture signals divided by the subband dividing means; and a second coding means for coding each of the subband picture signals divided by the subband dividing means, wherein the second coding means codes only the signals inside of the content with respect to the block containing the boundary portion of the content in the subband picture signals, in accordance with the map signal resolution-transformed by the resolution transform means.

An image data decoding system adapted to the image data coding system, according to the fifth aspect of the present invention, comprises:

a first decoding means for decoding a coded map signal indicative of the position and shape of a content in a screen inputted for every square block of picture signals to be coded;

a resolution transform means for performing the resolution transform of the map signal decoded by the first decoding means, into the resolutions of a plurality of subband picture signals;

a second decoding means for decoding a plurality of coded subband signals; and a subband synthesizing means for deriving a resolution-transformed regenerative picture signal by synthesizing only the subband picture signals necessary to reproduce an image of a predetermined resolution among the plurality of subband picture signals decoded by the second decoding means, wherein the second decoding means decodes only the subband picture signals inside of the content with respect to the blocks containing the boundary portion of the content among the subband picture signals, in accordance with the map signal resolution-transformed by the resolution transform means.

In an image data coding and/or decoding system, according to the first aspect of the present invention, it is possible to code transform coefficients and a map signal in a coding system, by performing the two-dimensional orthogonal transform of the picture signals of all the pixels with respect to the blocks (inside blocks) located inside of a content, and of only the picture signals of pixels contained in the content with respect to the blocks (edge blocks) containing the boundary portion of the content, in accordance with a map signal indicative of the position and shape of the content. It is also possible to perform the resolution transform with respect to the edge blocks containing a content of an optional shape in a decoding system, by selecting an orthogonal transform coefficient necessary to reproduce an image of a desired resolution from decoded orthogonal transform coefficients on the basis of a decoded and resolution-transformed map signal, and by performing the two-dimensional orthogonal transform of all the coefficients with respect to the inside blocks and of only the coefficients contained in the content with respect to the edge blocks, respectively.

In this case, it is designed to be able to switch the order of the one-dimensional orthogonal transform in the horizontal and vertical directions in the two-dimensional orthogonal transform, to detect the correlation in the horizontal and vertical directions of the picture signals inside of the content, for performing, first, the one-dimensional orthogonal transform with respect to the direction having higher correlation, so that it is possible to improve the coding efficiency.

In an image data coding and/or decoding system, according to the second aspect of the present invention, in a coding system, by coding a map signal, outputting an average value of the values of pixels inside of a content with respect to blocks containing the boundary portion of the content among picture signals in accordance with the map signal, separating the average value from the values of pixels inside of the content, and setting the values of pixels outside of the content to be zero, to perform the two-dimensional orthogonal transform of the signals from which the average value has been separated, it is possible to code the orthogonal transform coefficients and the average value. In a decoding system, by selecting an orthogonal transform coefficient necessary to reproduce an image of a desired resolution from decoded orthogonal transform coefficients on the basis of a decoded and resolution-transformed map signal, and deriving a resolution-transformed regenerative picture signal by synthesizing the results of the two-dimensional inverse orthogonal transform with the decoded average value of the values of pixels inside of the content, it is possible to perform the resolution transform with respect to the edge blocks containing a content of an optional shape. In addition, it is possible to enhance the coding efficiency in the edge blocks by separating the average value inside of the content from the average value outside thereof for coding.

In an image data coding and/or decoding system, according to the third aspect of the present invention, a coding system can code a map signal, replace the values of pixels outside of a content by the average value of the values of pixels inside of the content with respect to blocks containing the boundary portion of the content among the picture signals in accordance with a map signal, output the replaced values, and perform the two-dimensional orthogonal transform of the signal of the average value in the block to code its orthogonal transform coefficient. In addition, a decoding system can select an orthogonal transform coefficient necessary to reproduce an image of a predetermined resolution from coded orthogonal transform coefficients on the basis of a coded and resolution-transformed map signal, and take out the values of pixels inside of the content with respect to the edge blocks on the basis of the results of the two-dimensional orthogonal transform to derive a resolution-transformed regenerative picture signal, so that it is possible to perform the resolution transform with respect to the edge blocks containing a content of an optional shape.

In an image data coding and/or decoding system, according to the fourth aspect of the present invention, a coding system can code a map signal, perform the matching only the signals inside of a content with a code vector with respect to the edge blocks in accordance with the map signal, perform the vector quantization, and code an index indicative of the code vector of the highest correlation. In addition, in a decoding system, when performing the inverse vector quantization of the code vector designated by the decoded index, only the signals inside of the content are taken out from the code vector with respect to the edge blocks in accordance with a decoded and resolution-transformed map signal, to derive a resolution-transformed regenerative picture signal, so that it is possible to perform the resolution transform with respect to the edge blocks containing a content of an optional shape.

In an image data coding and/or decoding system, according to the fifth aspect of the present invention, when picture signals are divided into subbands to be coded in a coding system, only the signals inside of a content with respect to the edge blocks in subband picture signals are coded in accordance with a map signal resolution-transformed into resolutions of subband picture signals. In addition, in a decoding system, when subband-synthesizing only the subband picture signal necessary to derive a regenerative picture signal of a predetermined resolution, only the signals inside of the content with respect to the edge blocks among the subband picture signals are decoded in accordance with a map signal resolution-transformed into the resolution of each of the subband picture signals, so that it is possible to perform the resolution transform with respect to the edge blocks containing a content of an optional shape.

According to the present invention, a method for performing the two-dimensional orthogonal transform and/or the inverse orthogonal transform for blocks of an optional shape is provided. That is, a two-dimensional orthogonal transform method, according to the present invention, comprises:

a first transform step for performing the one-dimensional orthogonal transform in the horizontal direction in accordance with a map signal indicative of the shape of a block inputted, and for performing the rearrangement in order of the lower of coefficients in the horizontal direction; and a second transform step for performing the one-dimensional orthogonal transform in the vertical direction in accordance with the map signal, and for performing the rearrangement in order of the lower of coefficients in the vertical direction, wherein with respect to a signal of an optional shape, the second transform step is performed after performing the first transform step, or the first transform step is performed after performing the second transform step.

According to the present invention, a two-dimensional inverse orthogonal transform method adapted to the aforementioned two-dimensional orthogonal transform method, comprises:

resolution transform step for performing the resolution transform of an input map signal;

a coefficient selecting step for selecting an orthogonal transform coefficient necessary to reproduce an image of the resolution in accordance with a resolution-transformed map signal;

a first inverse transform step for performing the one-dimensional orthogonal transform in the vertical direction with respect to the selected orthogonal transform coefficient, and for performing the rearrangement in the vertical direction; and a second inverse transform step for performing the one-dimensional orthogonal transform in the horizontal direction with respect to the selected orthogonal transform coefficient, and for performing the rearrangement in the horizontal direction, wherein a resolution-transformed signal of a block of an optional shape is reproduced by performing the first inverse transform step prior to the second inverse transform step when the first transform step is performed prior to the second transform step, and by performing the second inverse transform step prior to the first inverse transform step when the second transform step is performed prior to the first transform step.

BRIEF DESCRIPTION OF THE DRAWINGS

The present invention will be understood more fully from the detailed description given hereafter and from the accompanying drawings of the preferred embodiments of the invention. However, the drawings are not intended to imply limitation of the invention to a specific embodiment, but are for explanation and understanding only.

In the drawings:

FIG. 1 is a block diagram showing a basic concept of an image data coding system, according to the present invention;

FIG. 2 is a block diagram showing the detail structure of a coding means of an image data coding system, according to the present invention;

FIG. 8 is a schematic block diagram of the second preferred embodiment of an image data coding system, according to the present invention;

FIG. 9 is a detailed block diagram of a space-time filter in the second preferred embodiment of an image data coding system, according to the present invention;

FIGS. 10(a) and 10(b) are views showing pixels being objects of the space filter processing by the space-time filter in the second preferred embodiment of an image data coding system, according to the present invention;

FIG. 11 is a schematic block diagram of the third preferred embodiment of an image data coding system, according to the present invention;

FIG. 12 is a schematic block diagram of the fourth preferred embodiment of an image data coding system, according to the present invention;

FIG. 16 is a schematic block diagram of the seventh preferred embodiment of an image data coding system, according to the present invention;

FIG. 17 is a schematic block diagram of the eighth preferred embodiment of an image data coding system, according to the present invention;

FIG. 25 is a view showing a transform method for the AS-DCT;

FIG. 26 is a block diagram of an image data decoding system in the first preferred embodiment of an image data coding and/or decoding system, according to the present invention;

FIG. 29 is a block diagram of an orthogonal transform circuit in FIG. 28;

FIG. 30 is a block diagram of an inverse orthogonal transform circuit in FIG. 28;

FIG. 31 is a block diagram of an AS-DCT circuit in FIG. 29;

FIG. 32 is a block diagram of an AS-IDCT circuit in FIG. 30;

FIGS. 33(a) and 33(b) are view showing a switching operation of a transforming order for AS-DCT in the second preferred embodiment of an image data coding and/or decoding system, according to the present invention;

FIG. 34 is a block diagram of an image data decoding system in the second preferred embodiment of an image data coding and/or decoding system, according to the present invention;

FIG. 35 is a view showing an example of a method for determining a scan order in the first and second preferred embodiment of an image data coding and/or decoding system, according to the present invention;

FIG. 41 is a block diagram of an image data coding system in the fourth preferred embodiment of an image data coding and/or decoding system, according to the present invention;

FIG. 42 is a view showing a method for inserting an average value in the image data coding system of FIG. 41;

FIG. 43 is a block diagram of an image data decoding system in the fourth preferred embodiment of an image data coding and/or decoding system, according to the present invention;

FIG. 44 is a view showing a method for separation of pixels in the image data decoding system of FIG. 43;

FIG. 49 is a view showing a code block provided in the inverse vector quantizer of FIG. 48;

FIG. 52 is a block diagram of an image data coding system in the fifth preferred embodiment of an image data coding and/or decoding system, according to the present invention;

FIG. 53 is a block diagram of an image data decoding system in the fifth preferred embodiment of an image data coding and/or decoding system, according to the present invention;

FIG. 54 is a view showing an example of an image transmitting system to which an image data coding system and an image data decoding system, according to the present invention, are applied;

FIGS. 58(a) and 58(b) are views explaining a conventional method of the orthogonal transform of an optional shape; and FIG. 59 is a view explaining a method for actualizing the resolution transform using the orthogonal transform.

DESCRIPTION OF THE PREFERRED EMBODIMENT

Figure 3:
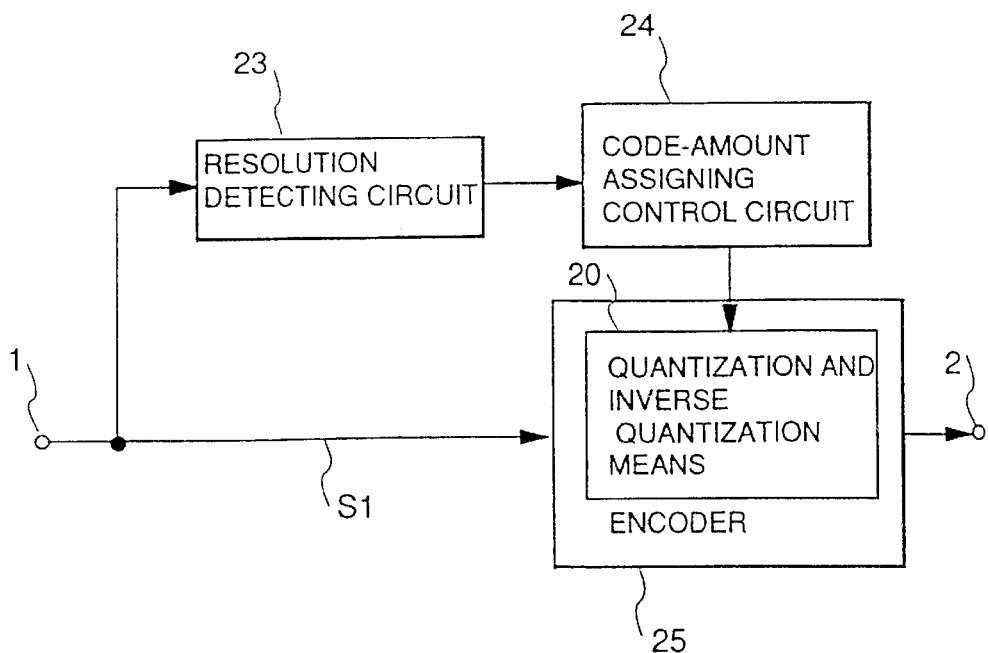
FIG. 3 is a schematic block diagram of the first preferred embodiment of an image data coding system, according to the present invention.

Referring now to the accompanying drawings, the preferred embodiments of the present invention will be described in detail below.

FIG. 1 is a block diagram showing the basic concept of the present invention. In this drawing, the reference numeral 1 denotes an input terminal for inputting an image data signal, 3 denotes an screen-area determining means for determining the area of the produced screen by analyzing the image data signal S1 inputted through the terminal 1 or by externally manual operations, 4 denotes a code amount assigning control means for outputting a control signal S2 which controls the assignment of the code amount using a weight function corresponding to the area of the screen on the basis of the determined results from the screen-area determining means 3, and 10 denotes a coding means for coding the image data signal SI inputted using the control signal S2 from the code amount assigning control means.

FIG. 2 is a detailed block diagram of the coding means 10 of FIG. 1. The image data signal S1 is supplied to a motion-vector detection circuit 11, a differential circuit 12 and a mode determining circuit 13. The coding means 10 further comprises: a reference frame memory 14, having variable delay function for motion-compensation, for storing a reference frame; a selector 15 for outputting an input signal or a differential signal; a selector 16 for outputting a signal of zero level or a motion-compensation signal; a DCT circuit 17 for performing the discrete cosine transform (DCT) of the output from the selector 15; and a quantization and inverse quantization means 20 for performing the quantization and inverse quantization processing of the output from the DCT circuit 17 in accordance with the weighting by the inputted control signal S2; an inverse DCT circuit 18 for performing the inverse discrete cosine transform of the output from the quantization and inverse quantization means 20; and an addition circuit 19 for adding the outputs from the selector 16 and the inverse quantization circuit 18. The quantization and inverse quantization means 20 comprises a quantization circuit 21 and an inverse quantization circuit 22.

With this construction, the motion-vector detecting circuit 11 detects a motion-vector between the reference frame stored in the reference frame memory 14 having the variable delay function for motion-compensation, and the inputted image data signal S1, for every microblock (MB) composed of 16×16 pixels.

The differential circuit 12 derives a difference between the motion-compensation signal S3 of the reference frame outputted from the reference frame memory 14, and the inputted image data signal S1, to supply the difference to the mode determining circuit 13 and the selector 15.

The mode determining circuit 13 compares the differential signal S4 outputted from the differential circuit 12 with the AC component of the inputted image data signal, to determine as to whether the intraframe or interframe coding of the block is performed. The determined results are supplied to the selector 15 and the selector 16 via the selector 15.

The selector 15 selects the inputted image data signal S1 when it is determined to perform the intraframe coding, and the differential signal S4 when it is determined to perform the interframe coding, to supply a selected signal S5 to the DCT circuit 17.

The DCT circuit 17 transforms the selected signal into the discrete cosine transform coefficient S6, to supply it for the quantization and inverse quantization means 20.

The quantization and inverse quantization means 20 quantizes the discrete cosine transform coefficient S6 supplied from the DCT circuit 17, in accordance with the control signal S2 relating to the quantization step size supplied for the quantization circuit 21 from a rate control circuit (not shown) of the code amount assigning control means, to output a transform coefficient signal S7. This quantization signal S7 is also supplied to the inverse quantization circuit 22, so that the inverse quantization circuit 22 performs the inverse quantization of the transform coefficient signal S7 into the discrete cosine transform coefficient S6 in accordance with the control signal S2 relating to the quantization step size.

The inverse DCT circuit 18 performs the discrete cosine inverse transforms of the discrete cosine transform coefficient S6 formed by the inverse quantization, to reproduce any signals selected by the selector 15. That is, when it is determined to perform the intraframe coding, a signal corresponding to the image data signal S1 is reproduced, and when it is determined to perform the interframe coding, a signal corresponding to the differential signal S4 is reproduced. The signal produced by the inverse transform by the inverse DCT transform circuit 18 is supplied to the addition circuit 19.

On the other hand, the selector 16 selects the signal of zero level when the mode determined by the mode determining circuit 13 is the intraframe coding, and it selects the motion-compensation estimating signal S3 stored in the reference frame memory 14 when the mode is the interframe coding, to supply the selected signal to the addition circuit 19. The addition circuit 19 adds the output of the selector 16 to the output of the inverse DCT circuit 18, to supply it to the reference frame memory 14. The reference frame memory 14 stores therein the addition signal outputted from the addition circuit 19, and supplies the reference frame signal when the motion-vector detection circuit 11 performs the motion-vector detection.

Furthermore, the transform coefficient S7 quantized by the quantization circuit 21 is variable-length coded with side information such as motion-vector, and then, it is multiplexed to be outputted.

Referring to FIGS. 3 to 7, the first preferred embodiment of an image data coding system, according to the present invention, will be described below.

In FIG. 3, an encoder 25 for coding the input image data S1 is provided between the input terminal 1 and the output terminal 2. The image data signal S1 is also supplied to the resolution detecting circuit 23 serving as the screen-area determining means 3. The resolution detecting circuit 23 detects the resolution (the number of pixels) of the input image data signal, to supply information, on the number of pixels to the code-amount assigning control circuit 24.

Figure 4:
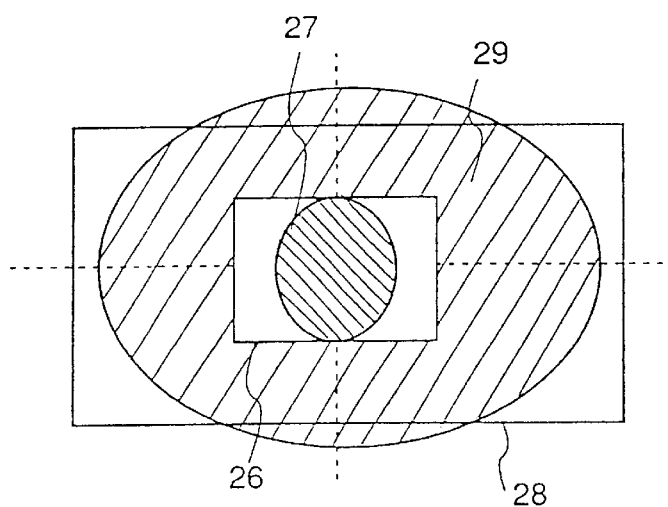
FIG. 4 is a view explaining the state of the distribution of closely observed points in the first preferred embodiment of an image data coding system, according to the present invention.

The code-amount assigning control circuit 24 first varies the weight distribution function for assigning the code amount corresponding to the position in the screen in accordance with the number of the pixels in the input image. The weight distribution function for the assignment of the code amount may be the standard deviation of a two-dimensional normal distribution as a function of the number of pixels, as shown in FIG. 5.22 of the aforementioned literature "Estimation Technique of Image Quality and Tone Quality". FIG. 4 is a rewritten view of FIG. 5.22 of the aforementioned literature, and shows the relationship between the distribution of closely observed points 27 in a contour 26 of a screen in a current television system, and the distribution of closely observed points 29 in a contour 28 of a screen in a high quality television system. As can be clearly seen from this drawing, the distribution of closely observed points extends as the size of the screen increases. Therefore, the two-dimensional normal distribution of closely observed points can be applied to the weight distribution function as a function of the number of pixels.

Figure 5A:
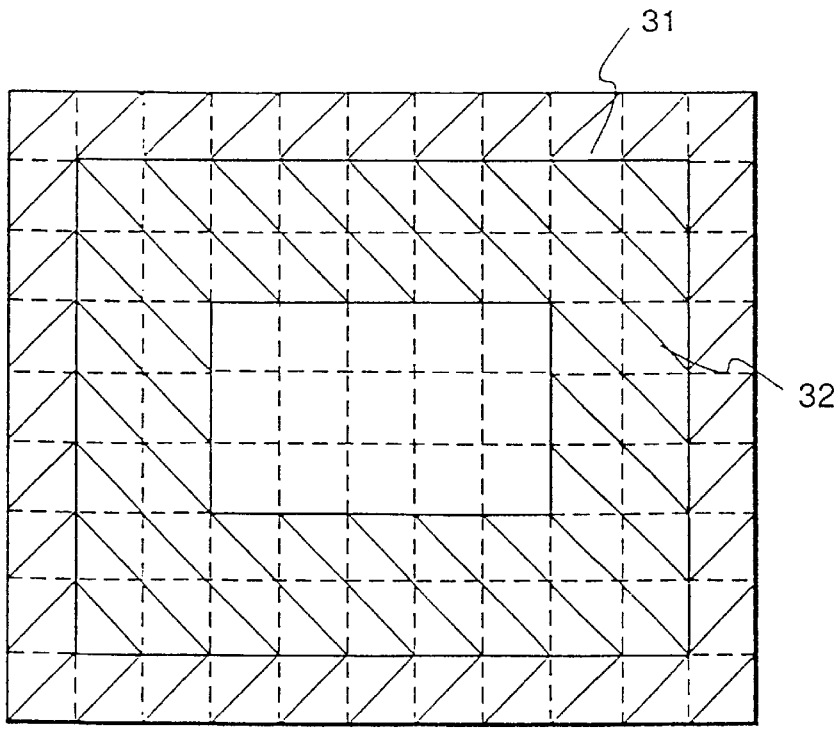
FIGS. 5(a) and 5(b) are views explaining the control of the coding in accordance with the distribution of regions in the first preferred embodiment of an image data coding system, according to the present invention.
Figure 5B:
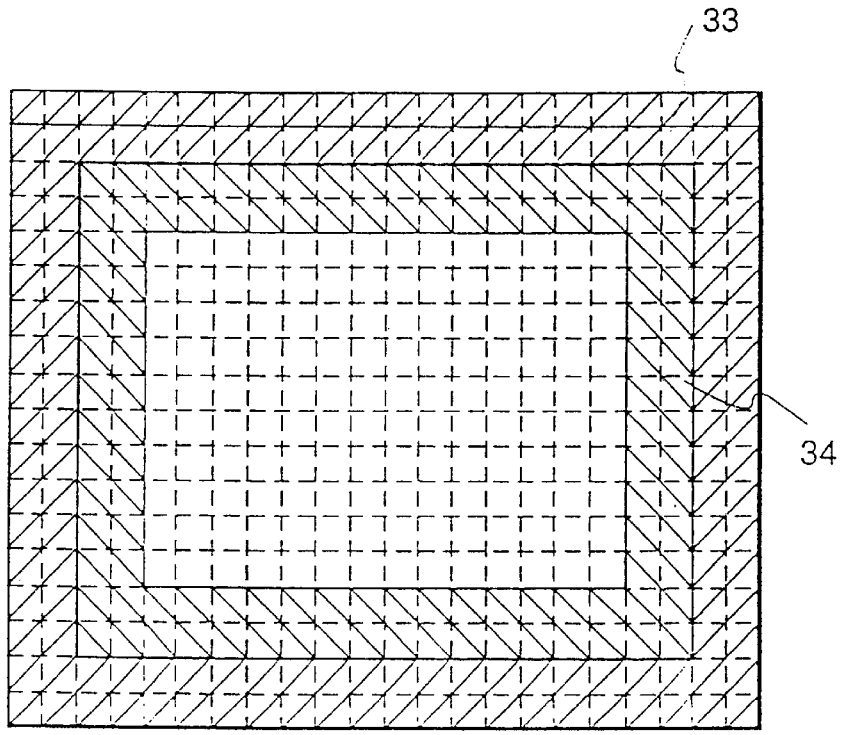

As shown in FIGS. 5(a) and 5(b), the weight distribution function for the assignment of the code amount may switch the weight for every region divided into microblocks (MB).

That is, in FIG. 5(a), the blocks divided by dotted lines are microblocks (MB), the weighting is performed so that the produced coded-amount of the region 31 is less than that of the region 32. This distribution function is set so that the weight of the central portion of the screen for the image having a less number of pixels as shown in FIG. 5(a) is greater than that for the image having a more number of pixels as shown in FIG. 5(b). The weight distribution function thus set is supplied to the encoder 25.

In accordance with the distribution function for the assignment of the code amount supplied by the code-amount assigning control circuit 24, the encoder 25 performs the weighting of the code amount produced by varying the quantization characteristic in accordance with the position of the pixel or the position of the block on the screen in the quantization and inverse quantization circuit 20.

Figure 6:
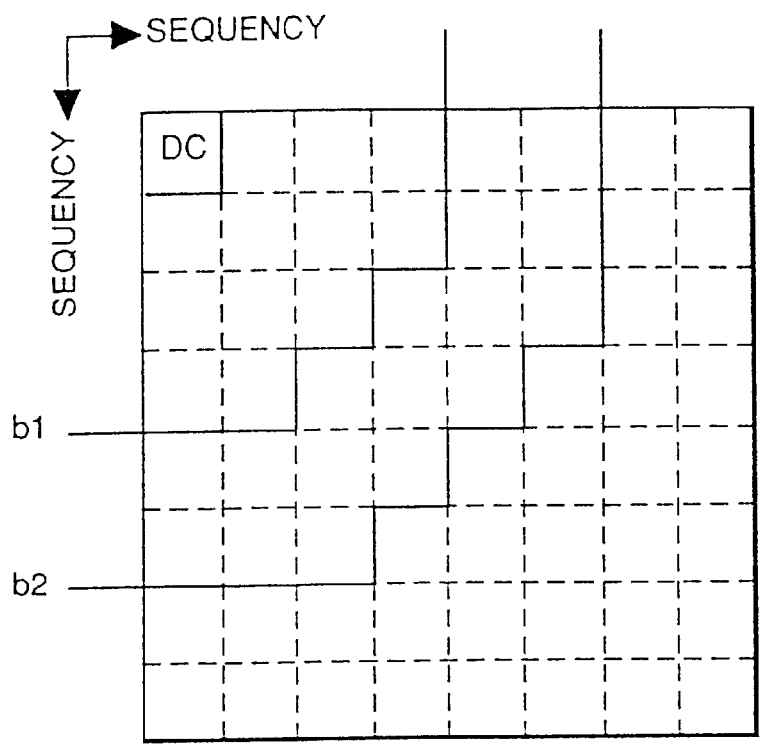
FIG. 6 is a view explaining the control of the coding of coefficient by the subband coding in the first preferred embodiment of an image data coding system, according to the present invention.

As a first method for varying the quantization characteristic, in the coding using the orthogonal transform and the subband coding, with respect to the first regions 31 and 33 located on the periphery of FIGS. 5(a) and 5(b), the coefficient of a higher frequency component than that of the boundary b1 of FIG. 6 is not compulsorily coded, and with respect to the second regions 32 and 34 located at an intermediate portion, the coefficient of a higher frequency component than that of the boundary b2 is not compulsorily coded.

In a second method for varying the quantization characteristic, the quantization matrix weighted for every transform coefficient is switched between the first and second regions 31 and 32 of FIG. 5(a) or between the first and second regions 33 and 34 of FIG. 5(b).

Figure 7A:
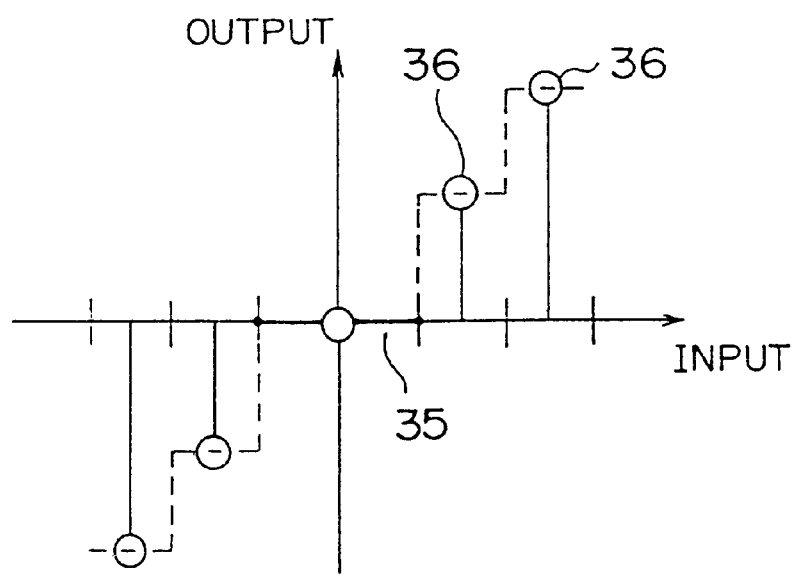
FIGS. 7(a) and 7(b) are views explaining the state that the quantization characteristic is changed by changing the dead zone of a quantizer in the first preferred embodiment of an image data coding system, according to the present invention.
Figure 7B:
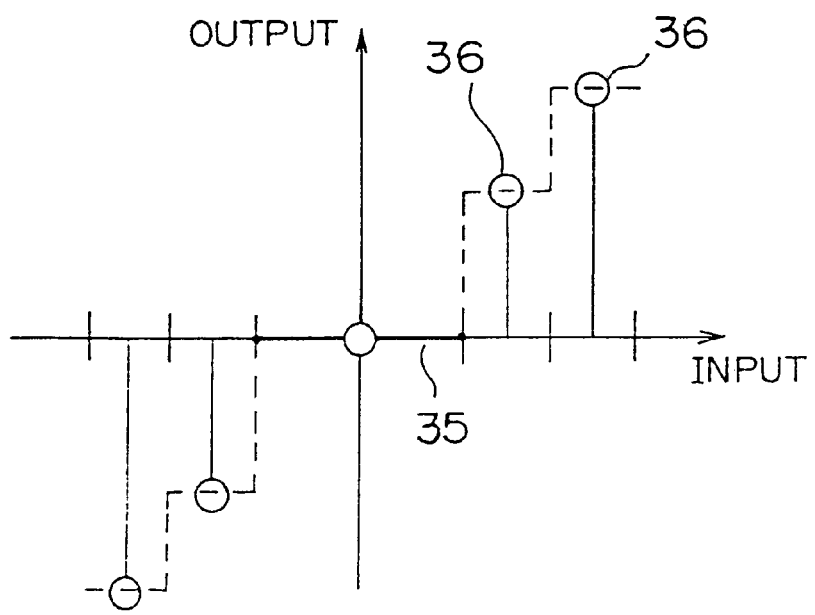

In a third method for varying the quantization characteristic, as shown in FIG. 7, the dead zone of the quantizer is changed. In FIG. 7, the reference numeral 35 denotes a dead zone, and 36 denotes typical values of quantization.

Referring to FIGS. 8 to 10, the second preferred embodiment of an image data coding system, according to the present invention, will be described in detail below.

The image data signal S1 is supplied to the frame memory 38. This frame memory 38 supplies an image signal S8 of the current frame to a resolution detecting circuit 23 and a space-time filter 40, and an image signal S9 of the previous frame only to the space-time filter 40.

FIG. 9 shows the detailed structure of the space-time filter 40. As shown in FIG. 9, the space-time filter 40 comprises an intraframe filter circuit 41 for performing the space filter processing of the image signal S8 of the current frame, a multiplication circuit 42 for multiplying the output of the filter circuit 42 in the frame by k, a multiplication circuit 43 for multiplying the image signal S9 of the inputted previous frame by "1-k", and an addition circuit 44 for adding the multiplied outputs of the multiplication circuits 42 and 43.

In a case where the output *X of a pixel X shown in each of FIGS. 10(a) and 10(b) is derived from the intraframe filter circuit 41 of the space-time filter 40, an example of operation formula is as follows.

$$*X=(A+mB+C+mD+mE+F+mG+H+m2\times)/(m+2)2$$

wherein m is a variable for varying the strength of the space filter.

The output *X of the intraframe space filter circuit 41 is multiplied by k by means of the multiplication circuit 42, to be added in the addition circuit 44 to the value derived by multiplying the input image signal P of the previous frame by "1-k" by means of the multiplication circuit 42, so that the time filter processing is carried out. The aforementioned k is a coefficient for varying the strength of the time filter. Furthermore, FIG. 10(a) is a view showing the relationship between the positions of the pixel X and P. The coefficients m and k are set so that the value of coefficient in the first region 31 of FIG. 5(a) is less than that in the second region 32 thereof, in accordance with the code-amount weight distribution function contained in the control signal S2 supplied from the code-amount assigning control circuit 24. In this way, the space-time filtering to the image signal of the first region 31 is strengthly performed, so that it is possible to restrain the produced code amount. The output of the space-time filter 40 is supplied to the encoder 25 as a signal S10, and coded here to be outputted to the outside via the output terminal 2.

Referring to FIG. 11, the third preferred embodiment of an image data coding system, according to the present invention will be described below.

The third preferred embodiment of an image data coding system is different from the second preferred embodiment of the system as shown in FIG. 8, at the points that the encoder 25 in the second preferred embodiment of the image data coding system comprises the same quantization and inverse quantization circuit 20 as that in the first preferred embodiment of the image data coding system as shown in FIG. 3, and that the code-amount assigning weight distribution function is not only supplied to the space-time filter 40, but also supplied to the quantization and inverse quantization circuit 20 of the encoder 25.

In FIG. 11, the coefficients m and k of the space-time filter 40 are set so that the value of coefficient of the first region 31 of FIG. 5 is less than that of the second region 32 thereof, in accordance with the code-amount assigning weight distribution function contained in the control signal S2 supplied from the code-amount assigning control circuit 24. In this way, the space-time filter processing of the first region 31 of FIG. 5 is stronger than that of the second region 32, so that the code amount produced in the first region 31 can be restrained.

The output of the space-time filter 40 is supplied to the encoder 25 as a signal S10, and coded to be outputted. In this encoder 25, since the code-amount assigning weight distribution function contained in the control signal S2 supplied from the code-amount assigning control circuit 24 is also supplied to the quantization and inverse quantization circuit 20, the quantization and inverse quantization circuit 20 performs the weighting of the produced code amount so as to vary the quantization characteristic in accordance with the positions of the pixels and the blocks on the screen, in the same manner as that of the first preferred embodiment. The image signal weighted so as to vary the quantization characteristic by the positions on the screen is coded with the produced code amount which is different in accordance with the positions, and then, outputted to the outside via the output terminal 2.

Referring to FIG. 12, the fourth preferred embodiment of an image data coding system, according to the present invention, will be described below.

This fourth preferred embodiment of an image data coding system is not provided with the space-time filter 40 in the third preferred embodiment of an image data coding system. In this embodiment, the image signal of the current frame of the frame memory 38 is supplied to the encoder 25, and the respective image signals of the current and previous frames are supplied to a face-region detecting circuit 45, so that the quantization characteristic of the quantization and inverse quantization circuit 20 is varied by a control signal S2 containing the code-amount assigning weight distribution function outputted from the code-amount assigning control circuit 24 which receives the output of the face-region detecting circuit 45 and the output of the resolution detecting circuit 23.

With the aforementioned construction, the face-region detecting circuit 45 detects the face region in the same manner as that of "Image Data Coding System" disclosed in the aforementioned Japanese Patent First (unexamined) Publication No. 5-95541, and the detected results are supplied to the code-amount assigning control circuit 24 as an output signal S11.

Figure 13A:
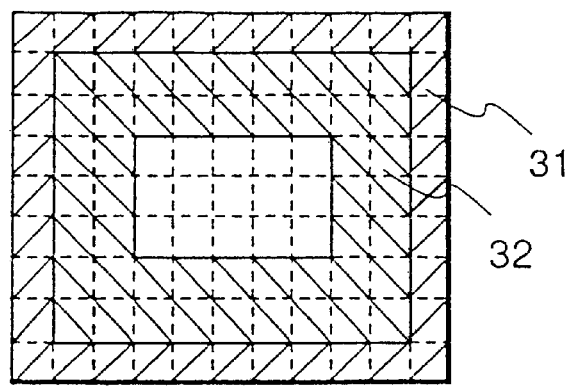
FIGS. 13(a) to 13(c) are views explaining the processing of assignment of the code amount in the fourth preferred embodiment of an image data coding system, according to the present invention.
Figure 13B:
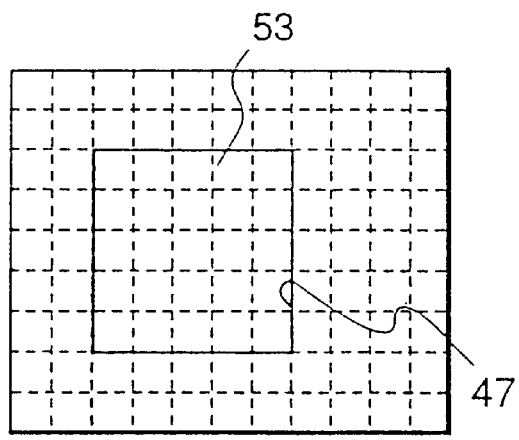
Figure 13C:
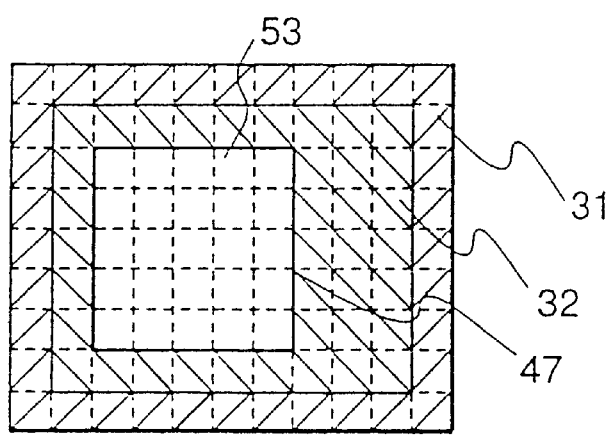

In the code-amount assigning control circuit 24, first, as shown in FIG. 13(a), the first region 31 and the second region 32 are determined in accordance with the number of pixels of the input image in the same manner as that of the first preferred embodiment, to vary the weight function for the assignment of the code amount in accordance with the positions on the screen. Then, the face region 47 of FIG. 13(b) is detected, and the weight distribution function is modified as shown in FIG. 13(c) in view of the detected results of the face region 47. An example of a method for this modification is as follows.

The interior of the face region 47 of FIG. 13(c) is assumed to be a third region 53. A part of the second region 32 of FIG. 13(a) which is not contained in the face region 47 of FIG. 13(c) becomes the second region 32. If a portion contained in the first region 31 of FIG. 13(1) is contained in the face region, this portion becomes the first region 31. A portion contained in the second region 32 and contained in the face region 47 of FIGS. 13(b) and 13(c) serves as the third region 53 of FIG. 13(c).

The weight distribution function as shown in FIG. 13(c) is supplied to the encoder 25.

In the encoder 25, in accordance with the code-amount assigning weight distribution function, the quantization and inverse quantization circuit 20 performs the weighting of the produced code amount by varying the quantization characteristic in accordance with the positions of the pixel and the block on the screen, in the same manner as that of the first preferred embodiment.

Figure 14:
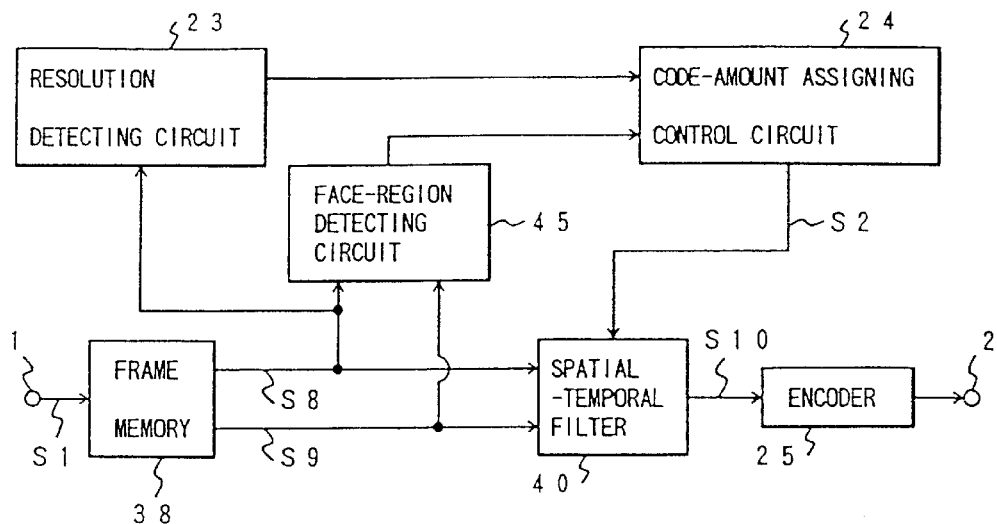
FIG. 14 is a schematic block diagram of the fifth preferred embodiment of an image data coding system, according to the present invention.

Referring to FIG. 14, the fifth preferred embodiment of an image data coding system, according to the present invention, will be described below.

This fifth preferred embodiment of an image data coding system comprises the combination of the second preferred embodiment of the system as shown in FIG. 8 with the fourth preferred embodiment of the system as shown in FIG. 12.

In FIG. 14, the image signal S8 of the current frame outputted from the frame memory 38 is supplied to three circuits, i.e. the resolution detecting circuit 23, the space-time filter 40 and the face region detecting circuit 45. The image signal S9 of the last frame is supplied to both of the space-time filter 40 and the face region detecting circuit 45. The outputs of the resolution detecting circuit 23 and the face region detecting circuit 45 are supplied to the code-amount assigning control circuit 24, so that the code-amount assigning weight distribution function is set. On the basis of this weight distribution function, the space-time filter 40 performs the space-time filter processing for the image signals S8 and S9 of the current and previous frames, and outputs a signal S10 to the encoder 25. The encoder 25 codes this signal S10 to output to the outside via the output terminal 2.

Figure 15:
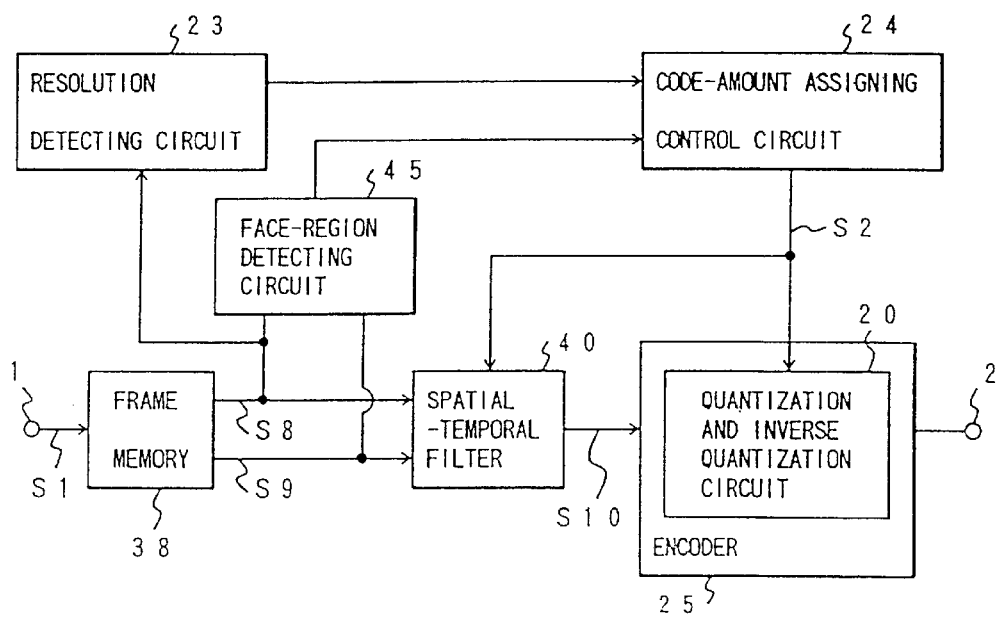
FIG. 15 is a schematic block diagram of the sixth preferred embodiment of an image data coding system, according to the present invention.

FIG. 15 is a block diagram showing the sixth preferred embodiment of an image data coding system, according to the present invention. In this sixth preferred embodiment, the encoder 25 in the fifth preferred embodiment corresponds to one comprising the quantization and inverse quantization circuit 20 in the second preferred embodiment. Since other components are the same as or correspond to the components having the same reference numerals as those in some preferred embodiments as mentioned above, only such reference numerals are used in the drawing, and the repeated explanations are omitted.

The space-time filter 40 of FIG. 14 receives a control signal S2 containing the code-amount assigning weight distribution function supplied from the code-amount assigning control circuit 24, and performs the space-time filter processing to output a signal S10 to the encoder 25.

In the encoder 25, in the weight distribution function contained in the control signal supplied from the code-amount assigning control circuit 24 in the same manner as that of the first preferred embodiment, the quantization and inverse quantization circuit 20 varies the quantization characteristic in accordance with the positions of the pixel and the block on the screen, to perform the weighting of the produced code amount.

FIG. 16 is a block diagram showing the seventh preferred embodiment of an image data coding system, according to the present invention. In FIG. 16, the characterizing feature of this seventh preferred embodiment is that a sink screen-size detecting circuit 50 is provided for receiving an output signal from the frame memory 38 to detect the size of the sink screen, and that the code-amount assigning control circuit 24 derives the code-amount assigning weight distribution function on the basis of both of the output signals of the sink screen-size detecting circuit 50 and the frame memory 38, and the derived function is supplied to the quantization and inverse quantization circuit 20 of the encoder 25. In a case where the space-time filter is provided, the same operation as that of the preferred embodiment of an image data coding system is performed, so that the repeated explanations are omitted.

FIG. 17 is a block diagram showing the eighth preferred embodiment of an image data coding system, according to the present invention.

In this drawing, the same face-region detecting circuit 45 as that in the fourth preferred embodiment as shown in FIG. 12 is provided in addition to the structures in the seventh preferred embodiment as shown in FIG. 16. To the code-amount assigning control circuit 24, the output of the face-region detecting circuit 45 in addition to the output of the sink screen-size detecting circuit 50 are supplied. Therefore, on the basis of the output of the sink screen-size detecting circuit 50 and the output of the face-region detecting circuit 45, the code-amount assigning control circuit 24 sets the code-amount assigning weight distribution function by the image data inputted through the frame memory 38, to output it to the quantization and inverse quantization circuit 20 of the encoder 25. The quantization and inverse quantization circuit 20 varies the quantization characteristic on the basis of the supplied distribution function, and performs the weighting of the produced code amount to output a signal to the outside via the terminal 2.

In the seventh and eighth preferred embodiments of an image date coding system, according to the present invention, it is possible to easily detect, on the sink, the size of the screen of the received information to be reproduced, the information being transmitted by transmitting the header information indicative of the size of the screen and so forth in addition to the image data signal.

In the seventh and eighth preferred embodiments of an image data coding system as shown in FIGS. 16 and 17, the size of the screen is internally and automatically detected on the sink to be controlled, by the sink screen-size detecting circuit 50 serving as means for detecting the size of the screen supplied to the code-amount assigning control circuit 24. However, the present invention is not limit to this structure, but the weighting of the produced code amount may be performed by input in an externally manual operation.

Figure 18:
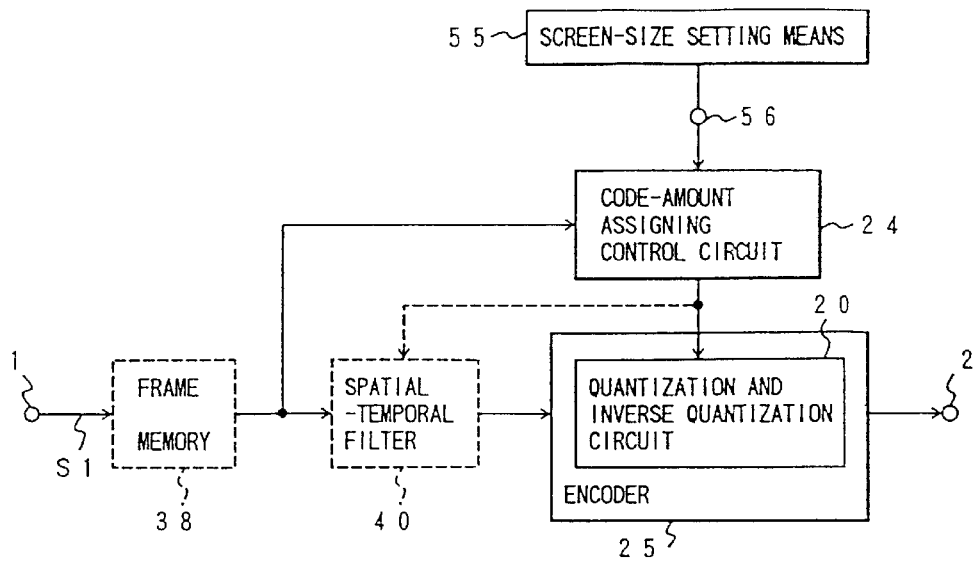
FIG. 18 is a schematic block diagram of the ninth preferred embodiment of an image data coding system, according to the present invention.
Figure 19:
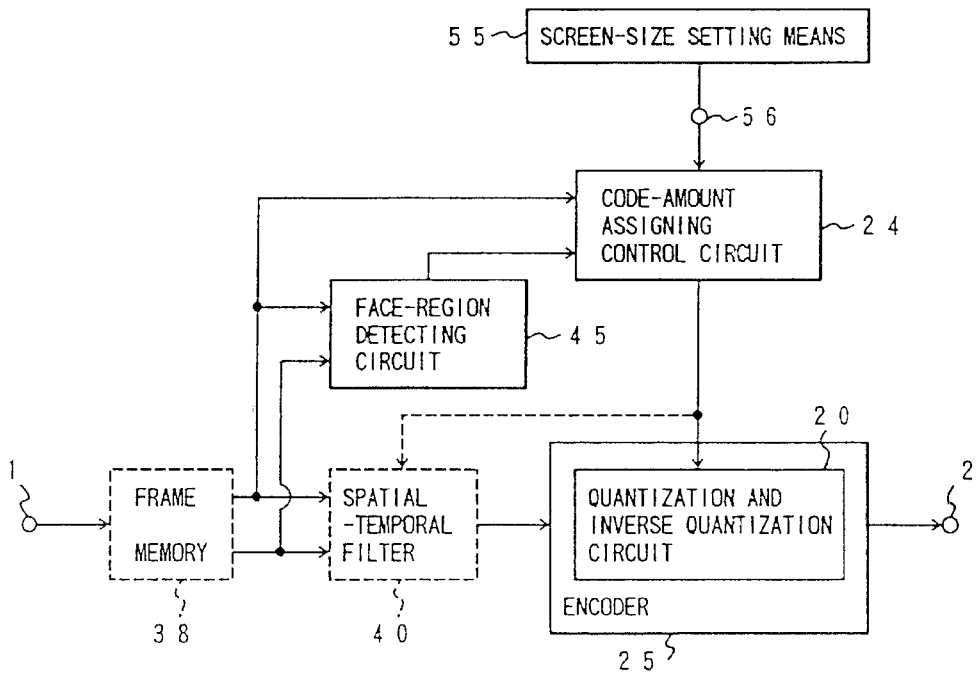
FIG. 19 is a block diagram of the tenth preferred embodiment of an image data coding system, according to the present invention.

That is, the ninth and tenth preferred embodiments of image data coding systems, as shown in FIGS. 18 and 19, according to the present invention, may be applied.

FIG. 18 is a schematic view of the ninth preferred embodiment of an image data coding system, according to the present invention. This ninth preferred embodiment of an image data coding system does not detect the size of the screen of the received information in the sink screen-size detecting circuit 50 in the seventh preferred embodiment of the image data coding system, and a screen-size setting means 55 is provided for setting the size of the screen in an externally manual operation. The screen-size setting means 55 does not detect the resolution of the received image data signal, the header information indicative of the area and so forth, to derive the size of the screen, but is designed so as to input the size of the received screen to the sink system in a manual operation. The information signal on the input screen-size is supplied to the code-amount assigning control circuit 24 of the coding system via an input terminal 56. The other constructions are the same as those of the seventh preferred embodiment.

Similar to the ninth preferred embodiment, the tenth preferred embodiment of an image data coding system as shown in FIG. 19 has the screen-size setting means 55 and the input terminal for inputting the information signal on the size of the received screen manually inputted via the input terminal 56. Since the other constructions are the same as those of the eighth preferred embodiment as shown in FIG. 17, the repeated explanations are omitted.

As mentioned above, an image data coding system, according to the present invention, includes a screen-area determining means which can automatically or manually set the area of the reproduced screen. Specifically, the screen-area determining means can analyze the resolution for analyzing the number of pixels, designate the size of the screen by the header information, set the size of the screen in a manual operation and so forth. Therefore, it is possible to improve the coding efficiency by reproducing the image after weighting in accordance with the distribution of the closely observed points in view of human's visual characteristic.

As mentioned above, an image data coding system, according to the present invention, was made by turning the inventor's attention that, in human's visual characteristic, the distribution of the closely observed points does not so diffuse when the object to be visually recognized is small, and it is designed to vary the assignment of the code amount on the respective regions on the screen without varying the code amount on the whole reproduced screen when the size of the screen is small. Therefore, it is possible to subjectively improve the picture quality of the reproduced image.

Referring to the drawings, particularly to FIGS. 20 to 54, the preferred embodiments of an image data coding and/or decoding system, according to the present invention, will be described below.

(First Preferred Embodiment)

Figure 20:
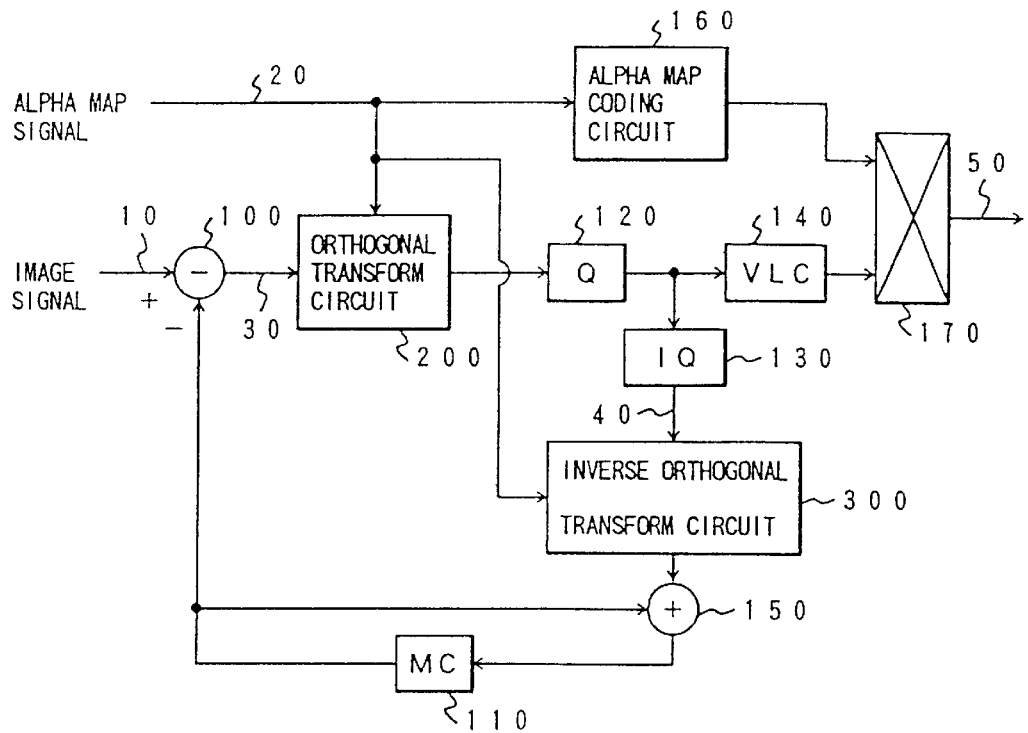
FIG. 20 is a block diagram of an image data coding system in the first preferred embodiment of an image data coding and/or decoding system, according to the present invention.

FIG. 20 is a block diagram of the first preferred embodiment of an image data coding system, according to the present invention. An input image signal 10 is divided into a plurality of square blocks by a blocking circuit (not shown) to be supplied to a substraction circuit 100. In the substraction circuit 100, a predicted error signal 30 which is a difference between a motion-compensated prediction signal supplied from a motion-compensated prediction circuit and the input image signal 10, is derived to be supplied to an orthogonal transform circuit 200.

The orthogonal transform circuit 200 transforms the predicted error signal 30 into an orthogonal transform coefficient in accordance with an alpha map signal 20 supplied block by block, and then, supplies the orthogonal transform coefficient to a quantization circuit 120. The quantized coefficient by the quantization circuit 120 is coded by a variable length coding circuit 140, as well as is inversely quantized by an inverse quantization circuit 130. An inversely quantized transform coefficient 40 is inversely transformed by an inverse orthogonal transform circuit 300, and then, added to the motion-compensated prediction signal, which is supplied from a motion-compensated prediction circuit 110, in an addition circuit 150.

A local-decoded image signal which is the output of the addition circuit 150, is stored in a frame memory in the motion-compensated prediction circuit 110. The transform coefficient coded by the variable length coding circuit 140, and the alpha map signal coded by an alpha map coding circuit 160, together with side information such as motion-vector information, are multiplexed in a multiplexed circuit 170 to be outputted as a code bit stream 50. Furthermore, the alpha map signal is coded by a method for coding a binary image, for example, by MMR (Modified Read).

The orthogonal transform circuit 200 and the inverse orthogonal transform circuit 300 in FIG. 20 will be described in detail below.

Figure 21:
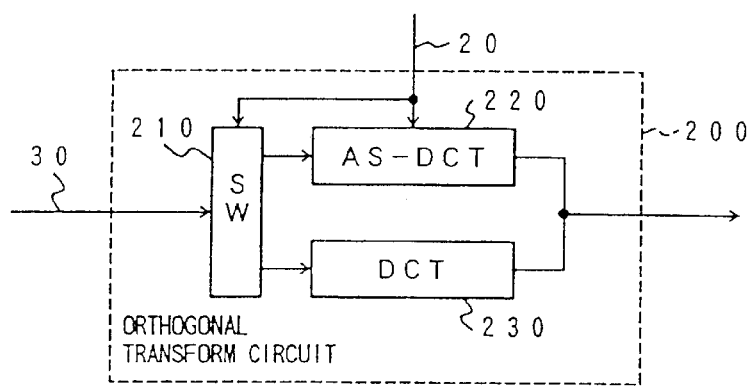
FIG. 21 is a block diagram of an orthogonal transform circuit in FIG. 20.
Figure 22:
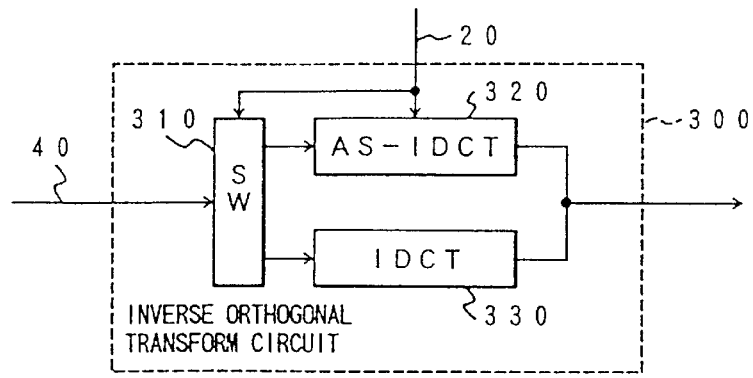
FIG. 22 is a block diagram of an inverse orthogonal transform in FIG. 20.

FIGS. 21 and 22 are detailed block diagrams of the orthogonal transform circuit 200 and the inverse orthogonal transform circuit 300, respectively.

The orthogonal transform circuit 200 as shown in FIG. 21 comprises a switch circuit 210, an AS-DCT circuit 220 and a DCT circuit 230. The alpha map signal 20 is supplied to both of the switch circuit 210 and the AS-DCT circuit 220. The switch circuit 210 determines as to whether the block of the input predicted error signal 30 is an internal block, an external block or an edge block as shown in FIG. 53, to supply the predicted error signal 30 to the DCT circuit 230 when it is the internal block, and the predicted error signal 30 to the AS-DCT circuit 220 when it is the edge block, i.e. the block containing the boundary portion of a content. Furthermore, when it is the external block, the coding is not performed or is performed by the other method.

Figure 23:
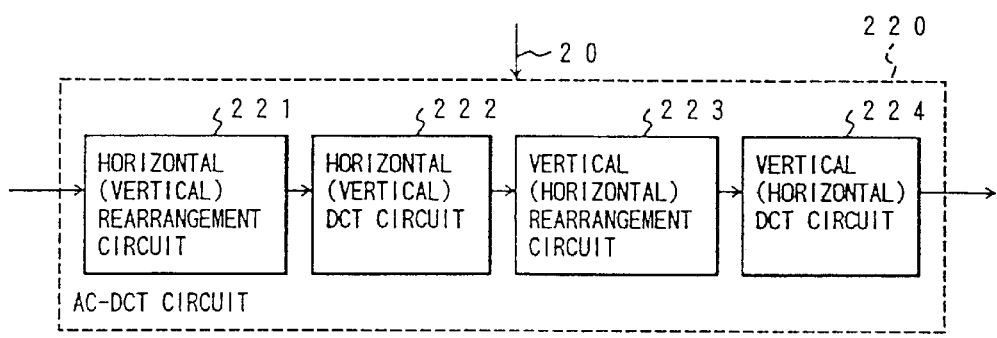
FIG. 23 is a block diagram of an AS-DCT circuit in FIG. 21.

FIG. 23 is a block diagram of the AS-DCT circuit 220, and FIG. 25 shows an example of a transform method in the AS-DCT. As shown in FIG. 25, the pixels contained in a content expressed by slanting lines in the input edge block are first put together to the left end by a rearrangement circuit 221. Then, in a DCT circuit 222, with respect to the pixels expressed by slanting lines, the one-dimensional DCT is performed in the horizontal direction. Then, in a DCT circuit 224, the transform coefficients expressed by a mesh are put together to the upper edge. Finally, in a DCT circuit 224, with respect to the transform coefficients expressed by a mesh, the one-dimensional DCT is performed in the vertical direction. Furthermore, it is possible to change the order of the rearrangement and DCT for processing.

The inverse orthogonal transform circuit 300 as shown in FIG. 22 comprises a switch circuit 310, an AS-IDCT circuit 320 and an IDCT circuit 330, and the alpha map signal 20 is supplied to both of the switch circuit 310 and the AS-IDCT circuit 320.

Figure 24:
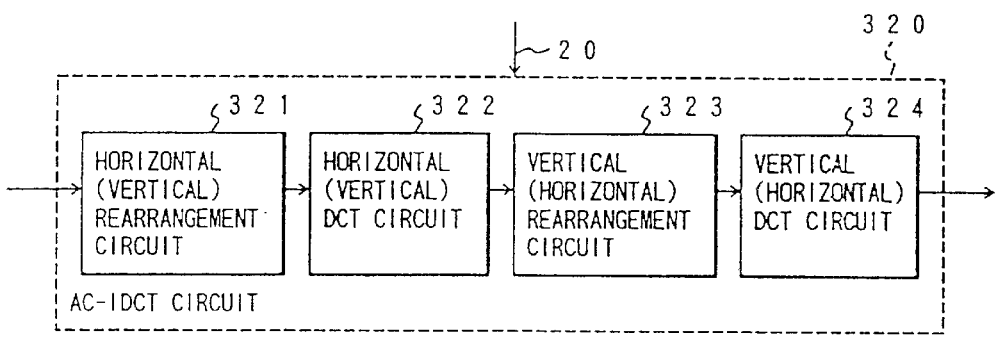
FIG. 24 is a block diagram of an AS-IDCT circuit in FIG. 21.

FIG. 24 is a block diagram of the AS-IDCT circuit 320 which comprises an IDCT circuit 321, a rearrangement circuit 322, an IDCT circuit 323 and a rearrangement circuit 324. Thus, in the inverse orthogonal transform circuit 300, the operation contrary to the orthogonal transform circuit 200 is performed.

An image data decoding system in this preferred embodiment will be described below.

FIG. 26 is a block diagram of an image data decoding system having the resolution transform function corresponding to the image data coding system of FIG. 20. The input code bit stream 60 is separated into the component of the transform coefficient and the alpha map signal in a separating circuit 400. The code of the transform coefficient is decoded by a variable length decoding circuit 410, and then, is inversely quantized by an inverse quantization circuit 420. On the other hand, the alpha map signal is decoded by an alpha map decoding circuit 430, and then, is transformed into a desired resolution by a resolution transform circuit 440.

Figure 27:
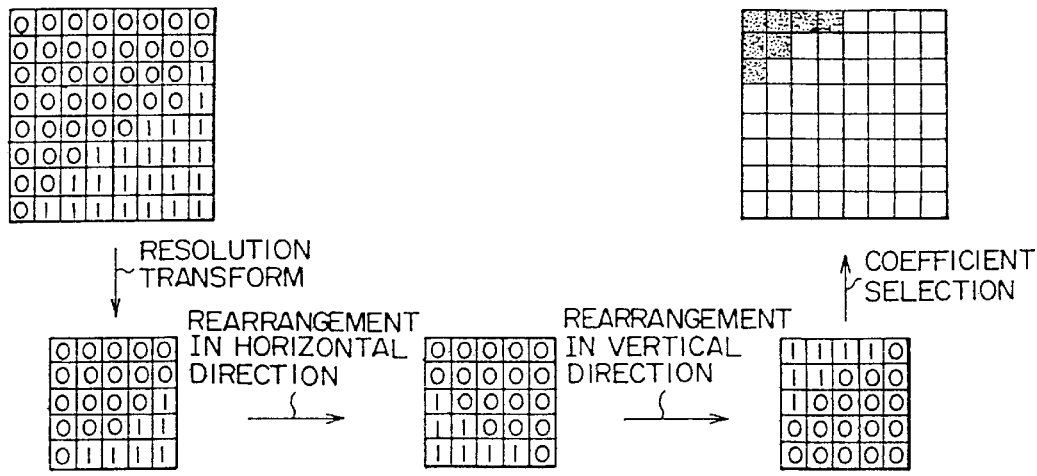
FIG. 27 is a view showing a resolution transform method in the first preferred embodiment of an image data coding and/or decoding system, according to the present invention.

The resolution transform circuit 440 performs the resolution transform of the alpha map signal which is a binary picture signal. As such a method for performing the resolution transform of a binary picture signal, for example, it is possible to use an enlargement and reduction method disclosed in "Image Processing Handbook" (p.630, Shokodo), which will be hereinafter referred to as "Literature 5". In a coefficient selecting circuit 450, the alpha map signal, the resolution of which is transformed in the resolution transform circuit 440, is rearranged in the horizontal direction, and then, in the vertical direction, in the same transform method as that of the aforementioned AS-DCT, as shown in FIG. 27. Furthermore, FIG. 27 is an example in which the resolution is transformed into ⅝ in both of the horizontal and vertical directions.

Then, the coefficient of a required band is selected from the transform coefficients supplied by the inverse quantization circuit 420, to be supplied to an inverse orthogonal transform circuit 460. In the inverse transform circuit 460, with respect to the transform coefficient of the internal block, the 5×5 of two-dimensional IDCT is performed, and with respect to the transform coefficient of the edge block, the AS-IDCT is performed in accordance with the resolution-transformed alpha map signal supplied by the resolution transform circuit 440, so that the inversely transformed signal is supplied to an addition circuit 470. The addition circuit 470 outputs a regenerative signal derived by adding a motion-compensated prediction signal supplied from a motion compensation circuit 480 to a signal supplied from the inverse orthogonal transform circuit 460.

(Second Preferred Embodiment)

Referring to FIGS. 28 to 34, the second preferred embodiment of an image data coding and/or decoding system, according to the present invention.

Figure 28:
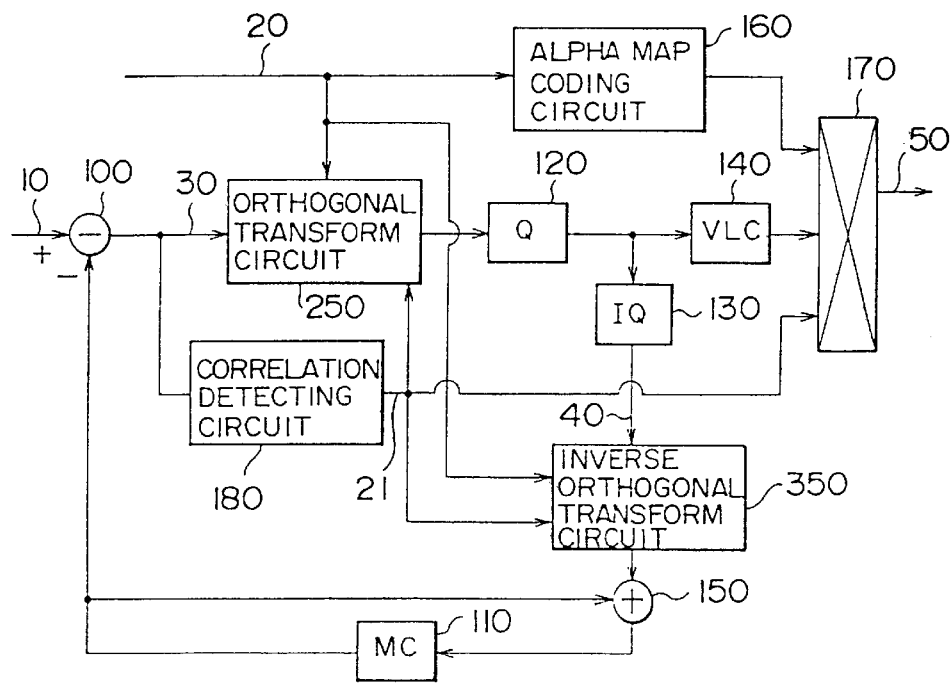
FIG. 28 is a block diagram of an image data coding system in the second preferred embodiment of an image data coding and/or decoding system, according to the present invention.

FIG. 28 is a block diagram of an image data coding system, according to the present invention. In this embodiment, an orthogonal transform circuit 250 and an inverse orthogonal transform circuit 350 comprise an As-DCT circuit and an AS-IDCT circuit which can switch the orders of the AS-DCT circuit 220 of FIG. 21 and the AS-IDCT circuit 320 of FIG. 22, respectively. A correlation detecting circuit 180 detects a correlation between the components of the predicted error signal 30 in the horizontal and vertical directions, and supplies a signal (a switch signal) 21 indicative of the direction of the high correlation to the orthogonal transform circuit 250, the inverse orthogonal transform circuit 350 and the multiplexer circuit 170. As a method for detecting the correlation in the correlation detecting circuit 180, for example, there is a method for deriving the square error between the adjacent pixels in the horizontal and vertical directions.

FIGS. 29 and 30 are detailed block diagrams of the orthogonal transform circuit 250 and the inverse orthogonal transform circuit 350, respectively. Similar to FIG. 21, the orthogonal transform circuit 250 as shown in FIG. 29 comprises a switch circuit 210, an AS-DCT circuit 260 and a DCT circuit 230. The alpha map signal 20 is supplied to the switch circuit 210 and the AS-DCT circuit 260, and the switching signal 21 is supplied to the AS-DCT circuit 260. The inverse orthogonal transform circuit 350 as shown in FIG. 30 comprises a switch circuit 310, an AS-IDCT circuit 360 and an IDCT circuit 330. The alpha map signal 20 is supplied to the switch circuit 310 and the AS-IDCT circuit 360, and the switching signal 21 is supplied to the IDCT circuit 330.

FIGS. 31 and 32 are block diagrams of the AS-DCT circuit 260 of FIG. 29 and the AS-IDCT circuit 360 of FIG. 30, respectively. FIG. 33 is a view explaining, in detail, a method for switching the order of transform in the AS-DCT circuit 260 and the AS-IDCT circuit 360. The order of transform is changed by switching first switch circuits 261, 361 and second switch circuits 262, 362 of FIGS. 31 and 32, in the manner as shown in FIGS. 33($a$) and 33($b$). Specifically, by means of the switching signal 21, the switch circuits 261, 262 are switched as shown in FIG. 33($a$) when the correlation in the horizontal direction is high, and as shown in FIG. 33($b$) when the correction in the vertical direction is high. Furthermore, the switching signal 21 may be coded with one bit block by block or with one bit by frame by frame.

An image data decoding system, according to the present invention, will be described below.

FIG. 34 is a block diagram of an image data decoding system having the resolution transform function corresponding to the image coding system of FIG. 28. The point different from the first preferred embodiment of an image data decoding system as shown in FIG. 26 is that a transform order switching signal 61 separated from an input coding bit stream 60 in the separating circuit 400 is supplied to an inverse orthogonal transform circuit 461. The inverse orthogonal transform circuit 461 is the same as the inverse orthogonal transform circuit 350 in the image data coding system as shown in FIG. 30, and switches the order of transform by the switching signal 61 in the same manner as that described in FIG. 33.

Figure 36:
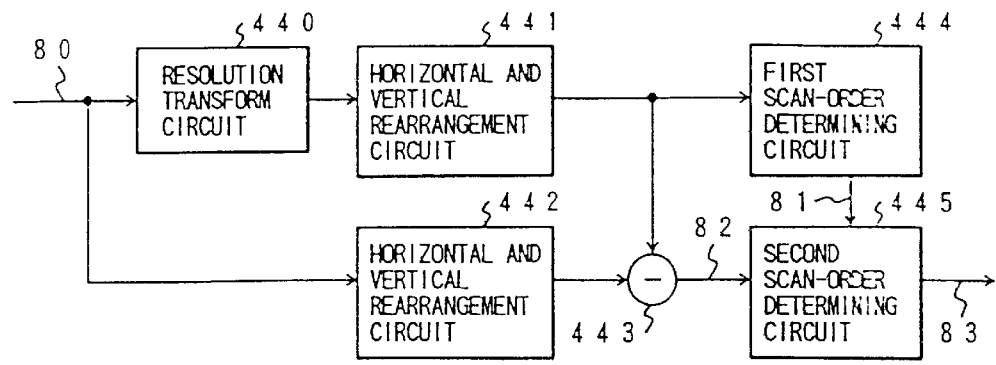
FIG. 36 is a block diagram of a scan order determining circuit for actualizing a scalable function in the AS-DCT.

Referring to FIGS. 35 and 36, an example of a method for scanning the transform coefficient of the AS-DCT will be described below. In general, in a case where the DCT coefficient of a square block is coded, after zigzag scan, the synthesized phenomenon of the magnitude of the coefficient and the zero run length is coded using the two-dimensional variable length coding (see "Image Coding Techniques -DCT and Its International Standard-", pp288–290). On the other hand, in the AS-DCT, due to the shape of the block, the distribution of the transform coefficient is leaned in the horizontal direction h and the vertical direction v as shown in FIG. 35. Therefore, according to this preferred embodiment, in both of the image data coding system and the image data decoding system, the order of scan is determined so as to adapt to the distribution of transform coefficients which can be specified by the alpha map signal.

FIG. 35 is an example of a method for determining the order of scan. First, the alpha map signal 20 (0: Outside of Content, 1: Inside of Content) is rearranged in the horizontal direction h and the vertical direction v to derive the distribution of transform coefficients (map [v][h]: v, h=0~size-1). Then, in accordance with a method described by C-Language as follows, the order of scan (order [v][h]:v, h=0~size-1) is determined.

```
cont=0;
for (s=0; s<2*size-1; s++){
  for (v=0; v<size; v++)
    for (h=0; h<size; h++){
      sequ=i+j;
      if (s==seq && map [v][h]){
        cont++;
        order [v][h]-cnt
      }
    }
}
```

In addition, various scan methods for actualizing scalable function on coding data has been proposed (see "Image Coding Techniques", FIG. 7.114).

FIG. 36 is a block diagram of a scan-method determining circuit for actualizing scalable function in the AS-DCT. In the resolution transform circuit 440, the resolution transform of an alpha map signal 80 is performed (for example, ½ in both of the horizontal and vertical directions) to be supplied to a first horizontal and vertical rearrangement circuit 441. To a second horizontal and vertical rearrangement circuit 442, the alpha map signal 80, the resolution transform of which is not performed, is supplied. In the horizontal and vertical rearrangement circuits 441, 442, the rearrangement as shown in FIG. 35 is performed. As a result, (map [v][h]) is supplied to a first scan-order determining circuit 444 and an exclusive OR operation circuit 443.

In the first scan-order determining circuit 444, the scan order (the order of a low-band component) of the resolution transformed alpha map signal is determined in a manner of FIG. 35, and the information 81 indicative of the scan order is supplied to a second scan-order determining circuit 445. The exclusive OR operation circuit 443 derives a difference between the map [v][h] of a low resolution supplied from the first horizontal and vertical rearrangement circuit 441 and the map [v][h] of a high resolution supplied from the second horizontal and vertical rearrangement circuit 442, and supplies this difference 82 to the second scan-order determining circuit 445.

In the second scan-order determining circuit 445, the scan order of a high-band component is determined subsequently to the scan order of the low-band component determined by the first scan-order determining circuit 444, and the information 83 indicative of the scan order of the combination of the low and high band components is output. This algorithm is applicable when more multistage division is performed to determine the scan order.

(Third Preferred Embodiment)

Referring to FIGS. 37 to 40, the third preferred embodiment of an image data coding and/or decoding system, according to the present invention, will be described below.

Figure 37:
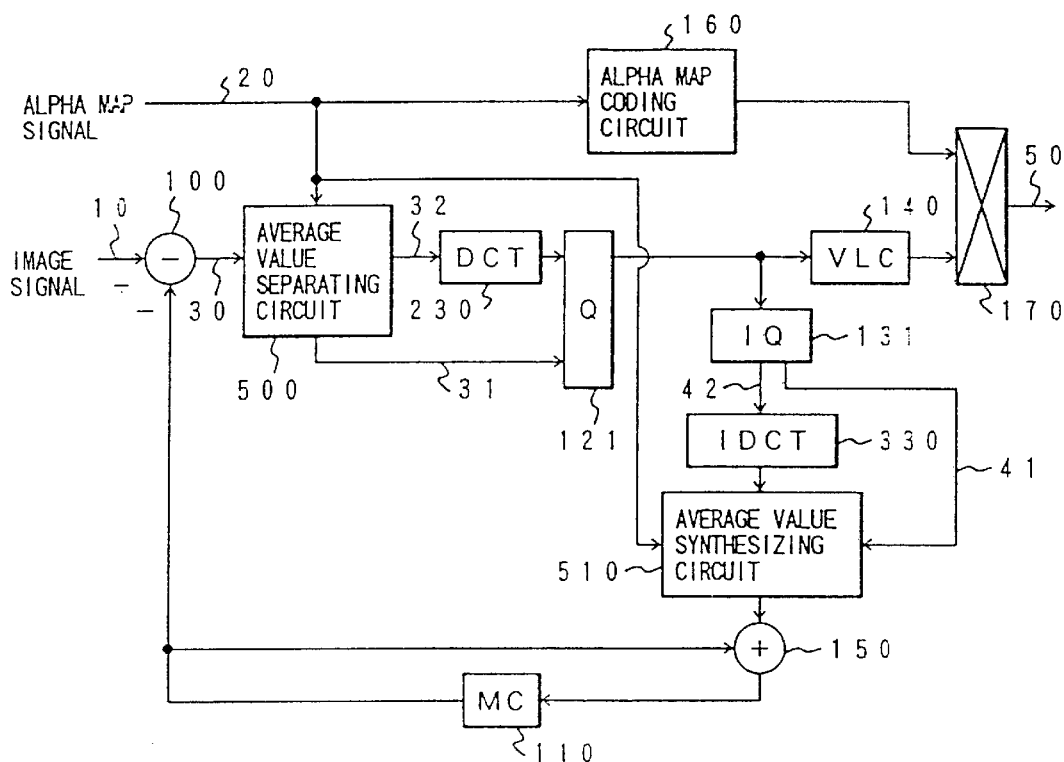
FIG. 37 is a block diagram of an image data coding system in the third preferred embodiment of an image data coding and/or decoding system, according to the present invention.
Figure 38:
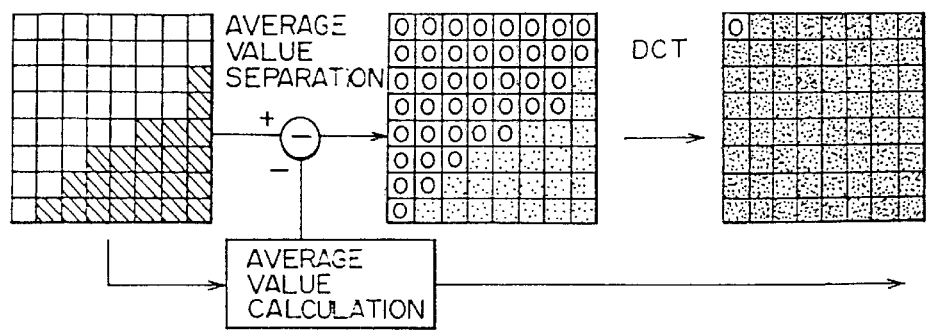
FIG. 38 is a view showing a method for separating an average value in the image data coding system in FIG. 37.

FIG. 37 is a block diagram of an image data coding system in this embodiment. In an average value separating circuit 500, if the predicted error signal 30 is an edge block signal in accordance with the alpha map signal 20, an average value of the signals inside of a content (the portion of oblique lines in FIG. 38) is derived to be separated, and all the signals outside of the content is set to be zero. By this processing, the average value in the central square blocks of FIG. 38 becomes zero. When the signal 32 indicative of the average value 0 in the blocks is supplied to the DCT circuit 230 for performing the two-dimensional DCT, the DC component becomes zero as the right-side square blocks of FIG. 38. In this case, an extrapolated signal may be substituted for the signals outside of the content under the condition that the average value is 0.

The average value 31 derived in the average value separating circuit 500, together with the alternating current transform coefficient of the DCT supplied from the DCT circuit, is supplied to a quantization circuit 121, and quantized to be supplied to an inverse quantization circuit 131 and a variable length coding circuit 140. In the inverse quantization circuit 131, the average value and the alternating current transform coefficient are inversely quantized. A quantized average value 41 is supplied to an average value synthesizing circuit 510, and a quantized alternating current transform coefficient 42 is supplied to the inverse DCT circuit 330.

In the average value synthesizing circuit 510, a regenerative signal is derived by synthesizing the signals inside of the content with the average value 41 in accordance with the alpha map signal 20 inversely transformed in the inverse DCT circuit 330. At this time, the signals outside of the content are reset to be, for example, zero.

An image data decoding system in this embodiment will be described below.

Figure 39:
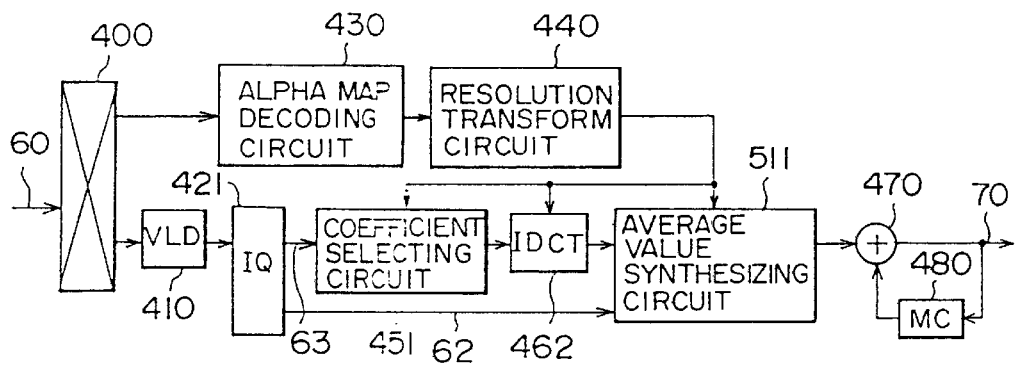
FIG. 39 is a block diagram of an image data decoding system in the third preferred embodiment of an image data coding and/or decoding system, according to the present invention.
Figure 40:
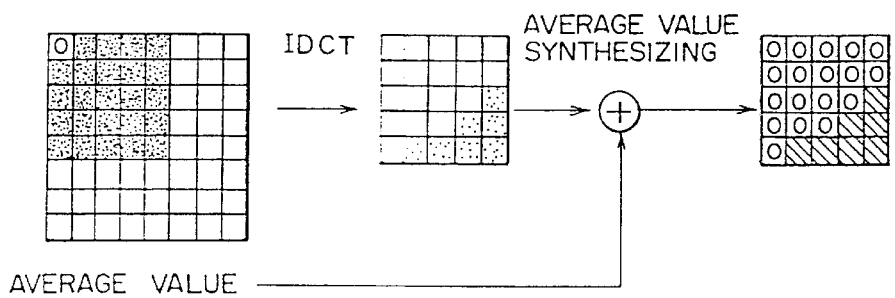
FIG. 40 is a view showing a method for synthesizing an average value in the image data decoding system of FIG. 39.

FIG. 39 is a block diagram of an image data decoding system having the resolution transform function corresponding to the image data coding system of FIG. 37, and FIG. 40 is a view showing a method for reproducing the signal that the resolution transform is performed. In FIG. 39, an inverse quantization circuit 421 inversely quantizes the average value and the alternating current transform coefficient, to supply an average value 62 to an average value synthesizing circuit 511 and an alternating current transform coefficient 63 to a coefficient selecting circuit 451, respectively. In an inverse DCT circuit 462, the DCT is performed with respect to the transform coefficient having a band necessary to derive a desired resolution selected in the coefficient selecting circuit 451 (in an example of FIG. 40, a 5×5 of two-dimensional IDCT).

In the average value synthesizing circuit 511, a regenerative signal is derived by synthesizing the signal inversely transformed by the inverse DCT circuit 462 with the average value 62 in the signals inside of the content, in accordance with the resolution-transformed alpha map signal supplied from the resolution transform circuit 440.

(Fourth Preferred Embodiment)

Referring to FIGS. 41 to 44, the fourth preferred embodiment of an image data coding and/or decoding system, according to the present invention will be described below.

FIG. 41 is a block diagram of an image data coding system in this embodiment. In an average value deriving circuit 501, when the predicted error signal 30 is the edge block signal in accordance with the alpha map signal 20, the average value a of the pixels inside of the content (the portion expressed by the oblique lines in FIG. 42) is derived to be supplied to an average value inserting circuit 502. In this average value inserting circuit 502, as shown in FIG. 42, the processing for assuming all the values of the pixels outside of the content to be the average value a of the pixels inside of the content is performed (the insertion of the average value). By this processing, the intrablock average value in the square block at the center of FIG. 42 becomes a. When the signal of this intrablock average value a is supplied to the DCT circuit 230 for performing the two-dimensional DCT, the DC component becomes A (=8×a) as the square block on the right-side of FIG. 42. At this time, an extrapolated signal may be substituted for the signal outside of the content under the condition that the average value is a.

The output of the average value inserting circuit 502 is supplied to the DCT circuit 230 to be transformed into a DCT coefficient, and then, is supplied to the quantization circuit 120 to be quantized therein. The quantized transform coefficient is supplied to the inverse quantization circuit 130 and the variable length coding circuit 140. In the inverse quantization circuit 130, the transform coefficient supplied by the quantization circuit 120 is inversely transformed to be supplied to the inverse DCT circuit.

In a pixel separating circuit 512, a regenerative picture signal is derived by separating the signals indicative of the pixels inside of the content from the signals inversely transformed in the inverse DCT circuit 330, in accordance with the alpha map signal 20. At this time, the signals outside of the content are reset to be zero for example.

An image data decoding system in this embodiment will be described below. FIG. 43 is a block diagram of an image data decoding system having the resolution transform function corresponding to the image data coding system of FIG. 41, and FIG. 44 is a view showing a method for reproducing a resolution-transformed signal. In FIG. 43, the transform coefficient is inversely transformed by the inverse quantization circuit 420 to be supplied to the coefficient selecting circuit 451. In the inverse DCT circuit 462, the DCT is performed with respect to the transform coefficient of a band required to derive a desired resolution selected by the coefficient selecting circuit 451 (in the example of FIG. 44, a 5×5 of two-dimensional IDCT).

In a pixel separating circuit 513, a regenerative signal is derived by separating the signal inversely transformed by the inverse DCT circuit from the signals indicative of the pixels inside of the content, in accordance with the resolution-transformed alpha map signal supplied from the resolution transform circuit 440.

(Fifth Preferred Embodiment)

Referring to FIGS. 45 to 49, the fifth preferred embodiment of an image data coding and/or decoding system, according to the present invention, will be described below.

In this embodiment, a method for coding a block of an optional shape by the vector quantization (VQ) is used. FIG. 41 is a block diagram of an image data coding system in this embodiment, and FIG. 42 is a view showing a method for coding in an edge block.

Figure 45:
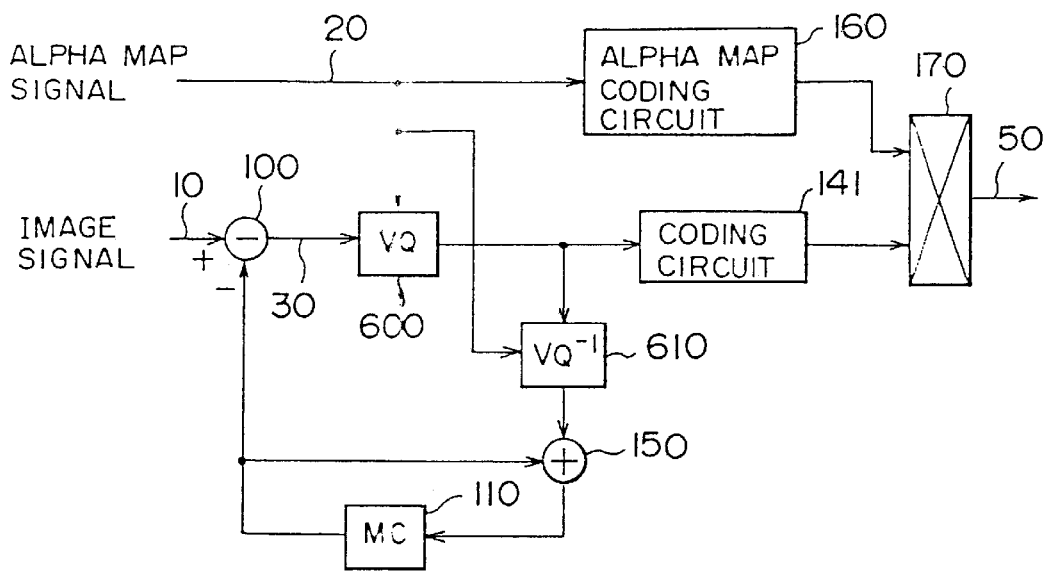
FIG. 45 is a block diagram of an image data coding system in the fourth preferred embodiment of an image data coding and/or decoding system, according to the present invention.
Figure 46:
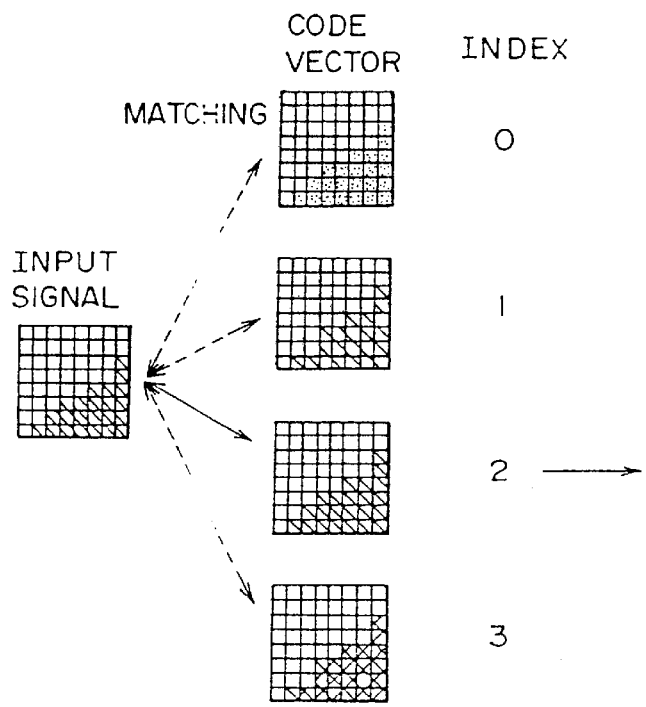
FIG. 46 is a view explaining a method for the vector quantization of a block of an optional shape in a vector quantizer of FIG. 45.

In FIG. 45, a vector quantizer 600 performs the matching of the predicted error signal 30 with code vectors stored in a code book, to select a code vector of the highest correlation to the predicted error signal 30. At this time, as shown in FIG. 46, with respect to the edge block, the matching of only the signals inside of the content (the portion expressed by the oblique lines in the drawing) with the code vectors is performed in accordance with the alpha map signal 20, to output an index of the code vector of the highest correlation ("2" in an example of FIG. 46).

Figure 47:
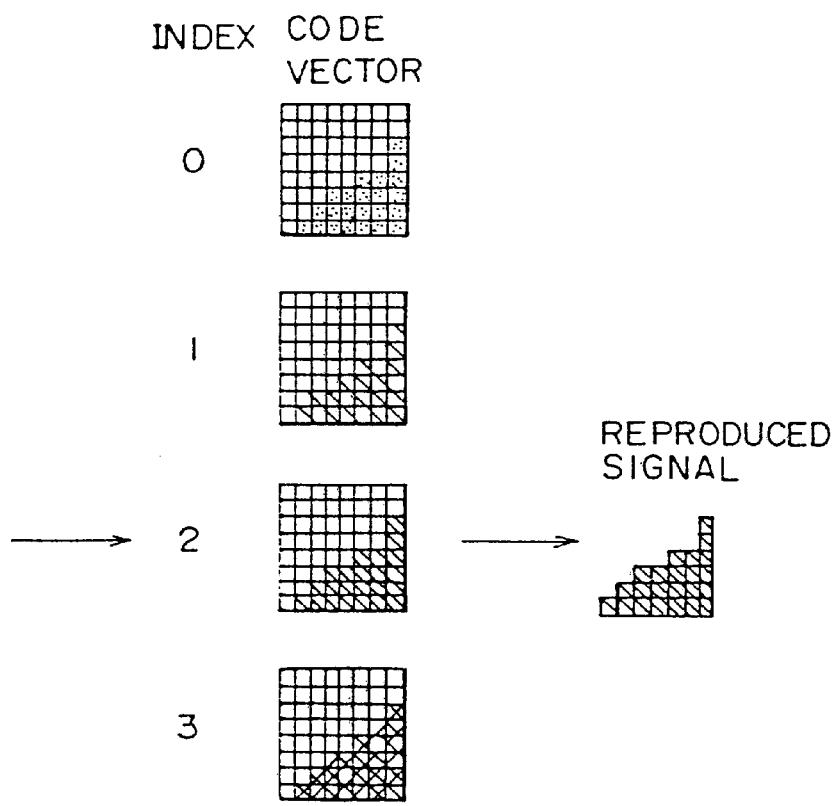
FIG. 47 is a view explaining a method for the inverse vector quantization of a block of an optional shape in an inverse quantizer of FIG. 45.

In the coding circuit 141, the index supplied by the vector quantizer 600 is coded with a variable length or a fixed length to be outputted to the multiplexer circuit 170. In an inverse vector quantizer 610, as shown in FIG. 47, the signals inside of the content (the portion expressed by the oblique lines in the drawings) are separated from the code vector corresponding to the index supplied from the vector quantizer 600 for outputting a regenerative signal.

An image data decoding system in this embodiment will be described below.

Figure 48:
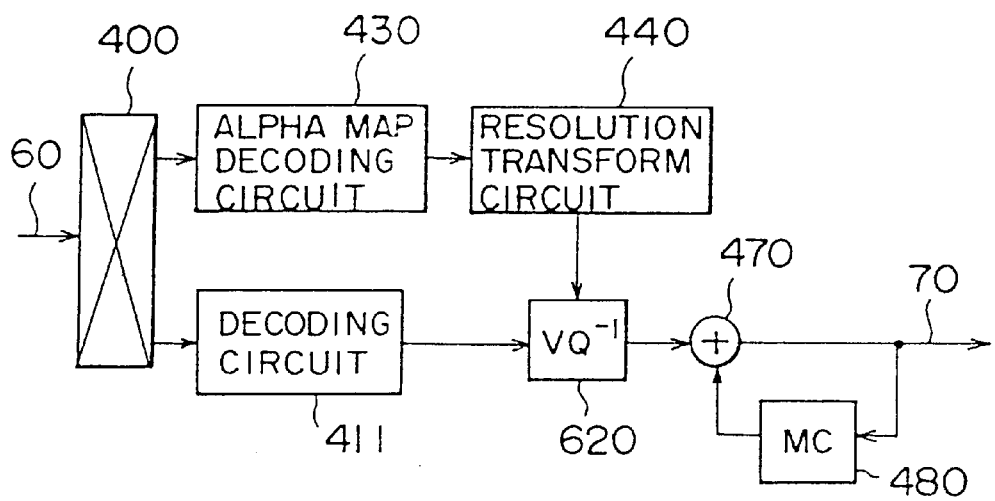
FIG. 48 is a block diagram of an image data decoding system in the forth preferred embodiment of an image data coding and/or decoding system, according to the present invention.

FIG. 48 is a block diagram of an image data decoding system having the resolution transform function corresponding to the image data coding system of FIG. 45, and FIG. 49 shows code blocks provided in an inverse vector quantizer 620. The alpha map signal separated by the separating circuit 400 from the input coding bit stream 60 is decoded by the alpha map decoding circuit 430, to be resolution-transformed into the resolution of each of picture signals by the resolution transform circuit 440. On the other hand, the index separated by the separating circuit 400 is decoded by the decoding circuit 411 to be supplied to the inverse vector quantizer 620.

In the inverse vector quantizer 620, as shown in FIG. 49, a code vector of a desired resolution is selected from code vectors expressed by multiple resolution corresponding to the index, and the signal inside of the content (the portion expressed by the oblique lines in the drawing) is separated in accordance with the resolution-transformed alpha map signal supplied from the resolution transform circuit 440. On the basis of this signal, a regenerative signal 70 is derived by the addition circuit 470 and the motion compensating circuit 480.

(Sixth Preferred Embodiment)

Referring to FIGS. 50 to 53, the sixth preferred embodiment of an image data coding and/or decoding system, according to the present invention, will be described below.

Figure 50:
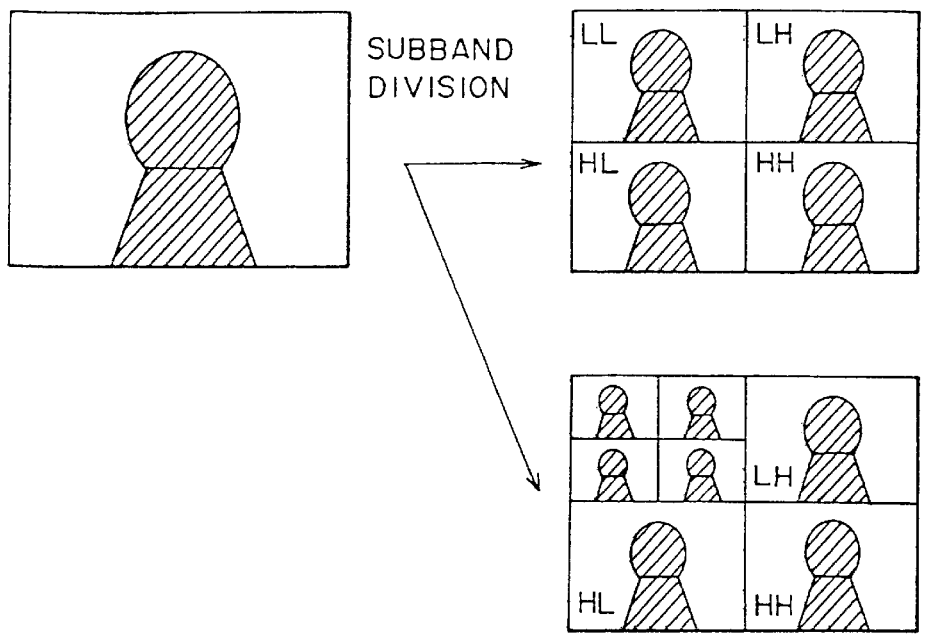
FIG. 50 is a view explaining the subband division of a picture signal in the fifth preferred embodiment of an image data coding and/or decoding system, according to the present invention.
Figure 51:
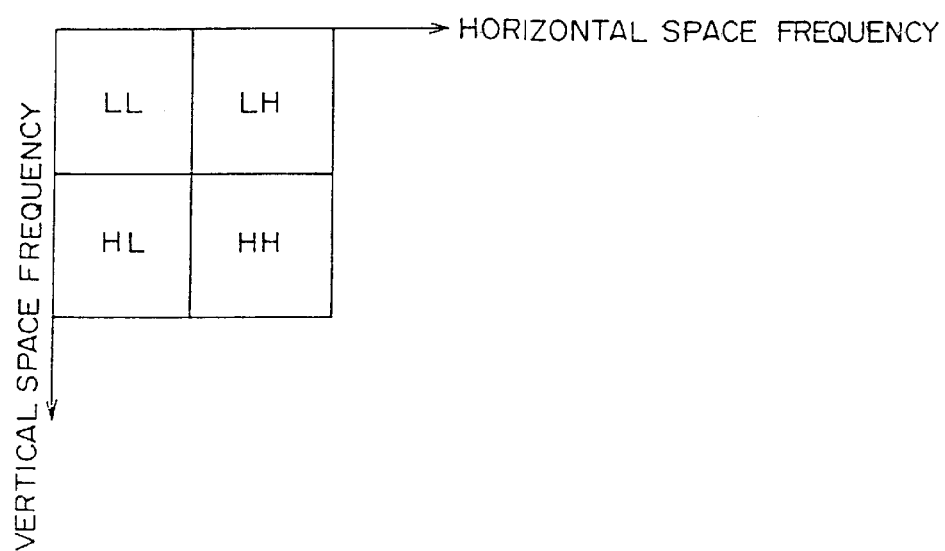
FIG. 51 is a view showing the arrangement of the respective components on the axes when a picture signal is divided into four subbands in the fifth preferred embodiment.
Figure 55:
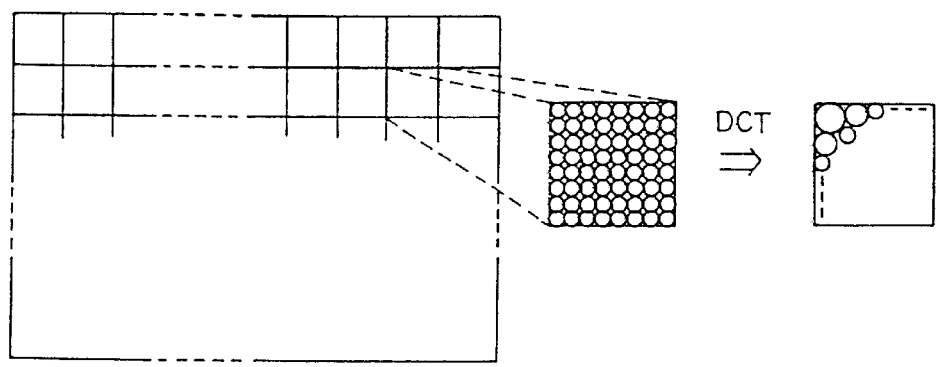
FIG. 55 is a view explaining the principle of a conventional image data coding system.
Figure 56:
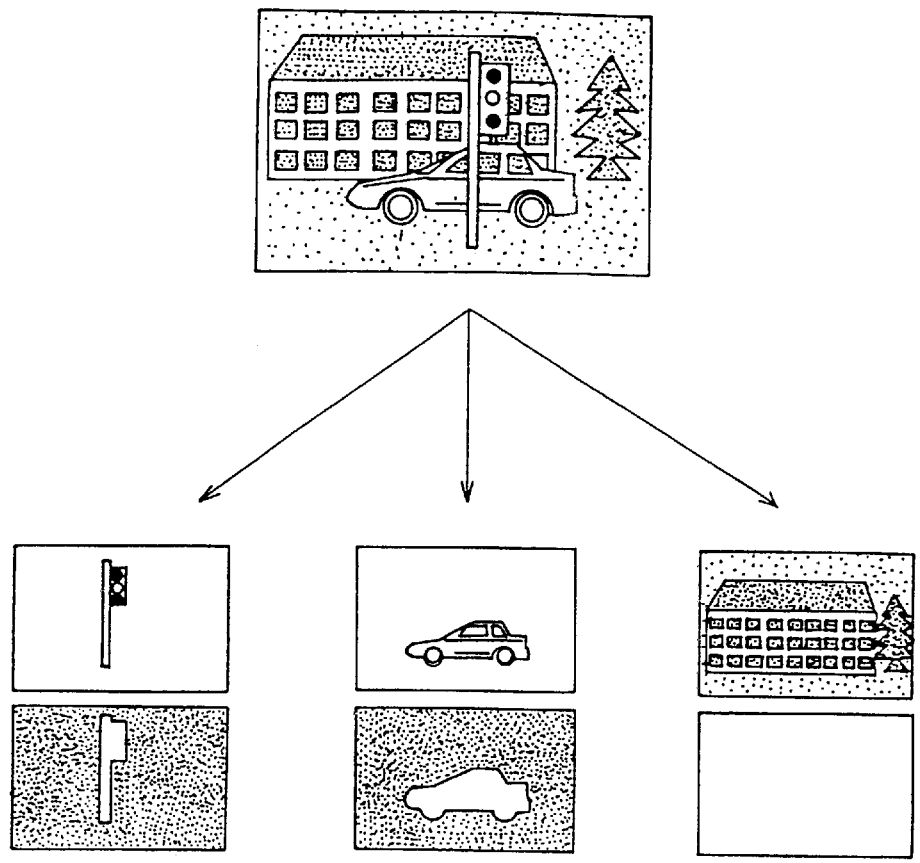
FIG. 56 is a view explaining a method for separating a picture signal into a background and a content for coding.
Figure 57:
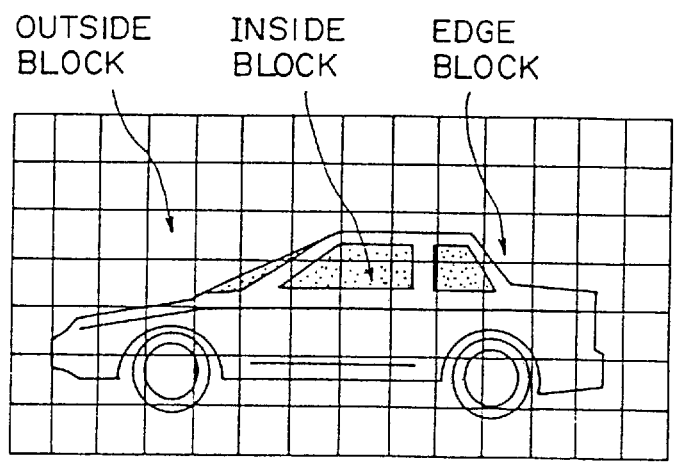
FIG. 57 is a view explaining a conventional content-based coding.

FIGS. 50 and 52 are views explaining the subband division of a picture signal. The subband division of the input picture signal is performed by the band division and the down sampling. FIG. 50 shows an example that the subband division is performed by dividing the input image into four bands (LL, LH, HL, HH) or further dividing the band LL into four bands to derive seven bands. FIG. 51 shows the arrangement of each of components on the axes of space frequencies when the subband division into four bands is performed. An example of the subband division of the input picture signal into four bands will be described below.

FIG. 52 is a block diagram of an image data coding system in this embodiment. The input picture signal 10 is divided into a plurality of subband picture signals in a subband division circuit 700, to be inputted to optional-shape coding circuits 710, 711, 712 and 713. The subband picture signals LL, LH, HL and HH are coded in the optional-shape coding circuits 710, 711, 712 and 713, respectively, in an optional-shape coding method which is the same manner as that described in any one of the first to fourth preferred embodiment. At this time, the alpha map signals are transformed to the resolution of each of the subband images by a resolution transform circuit 446, to be supplied to the optional shape coding circuits 710, 711, 712 and 713, respectively. The coded alpha map signals and the subband signals are outputted as a coding bit stream 50 through the multiplexer circuit 170.

FIG. 53 is a block diagram of an image data decoding system, in this embodiment, adapted to the image data coding system of FIG. 52. The alpha map signal separated by the separating circuit 400 from the input coding bit stream 60 is decoded by the alpha map decoding circuit 430, and the resolution transform thereof into the resolution of each of the subband picture signals is performed by the resolution transform circuit 446.

On the other hand, the subband picture signals separated by the separating circuit 400 are inputted to the optional-shape decoding circuits 720, 721, 722 and 723. In accordance with the alpha map signals supplied from the resolution transform circuit 446, the subband picture signals LL, LH, HL and HH are reproduced in the optional-shape decoding circuits 720, 721, 722 and 723, respectively, in the same optional-shape decoding method as that described in each of the first to fourth preferred embodiments. That is, for example, with respect to the edge block, only the subband image signals inside of the content are decoded.

Each of the reproduced subband picture signals are outputted as a regenerative picture signal 70 after synthesizing only the subband signals necessary to derive a predetermined resolution in a subband synthesizing circuit 730. For example, if only the subband image LL is outputted as the reproduced picture signal 70, the image of a low resolution is reproduced.

Referring to FIG. 54, as an applied embodiment of the present invention, the preferred embodiment of an image transmitting system to which an image data coding and/or decoding system of the present invention is applied, will be described below.

The picture signal inputted by a camera 1002 mounted on a personal computer (PC) 1001 is coded by an image data coding system installed in the PC 1001. The coding data outputted from this image data coding system is multiplexed with the information on other voice and data, to be sent by a wireless installation 1003 and received by another wireless installation 1004. The signal received by the wireless installation 1004 is analyzed into the coding data of the picture signals, and the information on voice and data. Among them, the coding data of the picture signals are decoded by an image data decoding system installed in a work station (EWS) 1005, to be indicated on a display of the EWS 1005.

On the other hand, the picture signals inputted by a camera 1006 mounted on the EWS 1005 is coded using an image data coding system installed in the EWS, in the same manner as that of the aforementioned manner. The coding data are multiplexed with the other information on voice and data, to be sent by the wireless installation 1004 and received by the wireless installation 1003. The signals received by the wireless installation 1003 are analyzed into the coding data of the picture signals, and the information on voice and data. Among them, the coding data of the picture signals are decoded by an image data decoding system installed in the PC 1001 to be indicated on a display of the PC 1001.

Furthermore, the sending and receiving of data can be performed using a wire transmitting system, not wireless transmitting system.

As mentioned above, according to the present invention, it is possible to perform the resolution transform of an edge block containing a content of an optional shape, and it is also possible to code the edge block without reducing the coding efficiency compared with conventional coding methods.

What is claimed is:

1. An image coding system comprising:
    first coding means for coding a map signal indicative of the position and shape of a content in a screen inputted for every block of picture signals to be coded;
    orthogonal transform means for performing the orthogonal transform of said picture signals in accordance with said map signal to output an orthogonal transform coefficient; and
    second coding means for coding said orthogonal transform coefficient derived by said orthogonal transform means,
    wherein said orthogonal transform means performs the two-dimensional orthogonal transform of the picture signals of all the pixels with respect to the blocks located inside of the content, and performs the orthogonal transform of only the signals of the pixels contained in the content with respect to the blocks containing the boundary portion of the content.

2. An image data coding system comprising:
    first coding means for coding a map signal indicative of the position and shape of a content in a screen inputted for every square block of picture signals to be coded;
    average value separating means for outputting the values of pixels, in the manner of outputting an average value of pixels when blocks include a boundary of the content, outputting a difference value between the average value and a pixel value when blocks are inside of the content, and outputting a zero value when blocks are outside of the content;
    orthogonal transform means for performing the two-dimensional orthogonal transform of the signals from which the average value has been separated by said average value separating means, to output orthogonal transform coefficients; and
    second coding means for coding said orthogonal transform coefficients outputted by said orthogonal transform means, and said average value.

3. An image data coding system comprising:
    first coding means for coding a map signal indicative of the position and shape of a content in a screen inputted for every square block of picture signals to be coded;
    average value inserting means for replacing the values of pixels outside of the content by an average value of the values of pixels inside of the content in accordance with said map signal, with respect to the blocks containing the boundary portion of the content in said picture signals;
    orthogonal transform means for performing the two-dimensional orthogonal transform of the signal of the average value in the blocks produced by said average value inserting means, to output orthogonal transform coefficients; and
    second coding means for coding said orthogonal transform coefficients outputted by said orthogonal transform means.

4. An image data coding system comprising:
    first coding means for coding a map signal indicative of the position and shape of a content in a screen inputted for every square block of picture signals to be coded;
    vector quantizing means for quantizing said picture signals in the manner of matching said picture signal with code vectors stored in a code book so as to output an index indicative of a code vector which has the highest correlation to said picture signal when blocks are inside of the content, and matching only the signals inside of the content with said code vectors when blocks contain the boundary portion of the content in accordance with said map signal; and
    second coding means for coding said index outputted by said vector quantizing means.

5. An image data coding system comprising:
    first coding means for coding a map signal indicative of the position and shape of a content in a screen inputted for every square block of picture signals to be coded;
    subband dividing means for dividing said picture signal into a plurality of subband picture signals;
    resolution transform means for performing the resolution transform of said map signal into the resolution of each of the subband picture signals divided by said subband dividing means; and
    second coding means for coding each of the subband picture signals divided by said subband dividing means when blocks are inside of the content, and coding only the signals inside of the content when the blocks contain the boundary portion of the content in said subband picture signals according to the map signal resolution-transformed by said resolution transform means.

6. An image coding system comprising:

a first coding part configured to code a map signal indicative of the position and shape of a content in a screen inputted for every block of picture signals to be coded;

an orthogonal transform part configured to perform the orthogonal transform of said picture signals in accordance with said map signal to output an orthogonal transform coefficient; and a second coding part configured to code said orthogonal transform coefficient derived by said orthogonal transform part, wherein said orthogonal transform part performs the two-dimensional orthogonal transform of the picture signals of all the pixels with respect to the blocks located inside of the content, and performs the orthogonal transform of only the signals of the pixels contained in the content with respect to the blocks containing the boundary portion of the content.

7. An image data coding system comprising:

a first coding part configured to code a map signal indicative of the position and shape of a content in a screen inputted for every square block of picture signals to be coded;

an average value separating part configured to output the values of pixels, in the manner of outputting an average value of pixels when blocks include a boundary of the content, outputting a difference value between the average value and a pixel value when blocks are inside of the content, and outputting a zero value when blocks are outside of the content;

an orthogonal transform part configured to perform the two-dimensional orthogonal transform of the signals from which the average value has been separated by said average value separating part, to output orthogonal transform coefficients; and a second coding part configured to code said orthogonal transform coefficients outputted by said orthogonal transform part, and said average value.

8. An image data coding system comprising:

a first coding part configured to code a map signal indicative of the position and shape of a content in a screen inputted for every square block of picture signals to be coded;

an average value inserting part configured to replace the values of pixels outside of the content by an average value of the values of pixels inside of the content in accordance with said map signal, with respect to the blocks containing the boundary portion of the content in said picture signals;

orthogonal transform part configured to perform the two-dimensional orthogonal transform of the signal of the average value in the blocks produced by said average value inserting part, to output orthogonal transform coefficients; and second coding part configured to code said orthogonal transform coefficients outputted by said orthogonal transform part.

9. An image data coding system comprising:

a first coding part configured to code a map signal indicative of the position and shape of a content in a screen inputted for every square block of picture signals to be coded;

a vector quantizing part configured to quantize said picture signals in the manner of matching said picture signal with code vectors stored in a code book so as to output an index indicative of a code vector which has the highest correlation to said picture signal when blocks are inside of the content, and matching only the signals inside of the content with said code vectors when blocks contain the boundary portion of the content in accordance with said map signal; and a second coding part configured to code said index outputted by said vector quantizing part.

10. An image data coding system comprising:

a first coding part configured to code a map signal indicative of the position and shape of a content in a screen inputted for every square block of picture signals to be code;

a subband dividing part configured to divide said picture signal into a plurality of subband picture signals;

a resolution transform part configured to perform the resolution transform of said map signal into the resolution of each of the subband picture signals divided by said subband dividing part; and a second coding part configured to code each of the subband picture signals divided by said subband dividing part when blocks are inside of the content, and coding only the signals inside of the content when the blocks contain the boundary portion of the content in said subband picture signals according to the map signal resolution-transformed by said resolution transform part.

* * * * *